US012498364B2

(12) United States Patent
Hayek

(10) Patent No.: US 12,498,364 B2
(45) Date of Patent: Dec. 16, 2025

(54) USE OF SOLUBLE UROKINASE PLASMINOGEN ACTIVATOR RECEPTOR LEVELS TO INDICATE PREVENTION OF CARDIOVASCULAR DISEASE WITH A STATIN

(71) Applicant: The Regents of the University of Michigan, Ann Arbor, MI (US)

(72) Inventor: Salim Hayek, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 342 days.

(21) Appl. No.: 17/694,295

(22) Filed: Mar. 14, 2022

(65) Prior Publication Data

US 2022/0341938 A1   Oct. 27, 2022

Related U.S. Application Data

(63) Continuation of application No. 16/838,711, filed on Apr. 2, 2020, now abandoned.

(60) Provisional application No. 62/828,187, filed on Apr. 2, 2019.

(51) Int. Cl.
| | | |
|---|---|---|
| *G01N 33/53* | (2006.01) | |
| *A61P 3/06* | (2006.01) | |
| *A61P 9/10* | (2006.01) | |
| *A61K 39/00* | (2006.01) | |
| *A61K 39/395* | (2006.01) | |
| *C07K 14/705* | (2006.01) | |
| *C07K 16/28* | (2006.01) | |

(52) U.S. Cl.
CPC .............. *G01N 33/53* (2013.01); *A61P 3/06* (2018.01); *A61P 9/10* (2018.01); *A61K 39/3955* (2013.01); *A61K 2039/505* (2013.01); *C07K 14/70596* (2013.01); *C07K 16/2896* (2013.01); *G01N 2333/705* (2013.01); *G01N 2800/324* (2013.01); *G01N 2800/52* (2013.01)

(58) Field of Classification Search
CPC .......... G01N 33/53; G01N 2333/705; A61K 39/3955; A61P 3/06
See application file for complete search history.

(56) References Cited

U.S. PATENT DOCUMENTS

| | | |
|---|---|---|
| 2014/0113969 A1 | 4/2014 | Cooper et al. |
| 2014/0370527 A1 | 12/2014 | Eugen-Olsen et al. |
| 2018/0161775 A1 | 6/2018 | Kapur et al. |
| 2019/0025328 A1 | 1/2019 | Beshiri et al. |

FOREIGN PATENT DOCUMENTS

| | | |
|---|---|---|
| WO | WO 2015/006713 | 1/2015 |
| WO | WO 2017/040488 | 3/2017 |

OTHER PUBLICATIONS

Rossebo et al (2013. Am J. Cardiol. 99: 970-973).*
Jirak et al: "Influences of Ivabradine treatment on serum levels of cardiac biomarkers sST2, GDF-15, suPAR and H-FABP in patients with chronic heart failure", Acta Pharmacologica Sinica, 2017;39(7):1189-1196.
Sabbak et al: "Circulating Soluble Urokinase Plasminogen Activator Receptor Levels Predict Mortality in Subjects Without Obstructive Coronary Artery Disease", JAAC, 2018; 71(11):A1870.
Extended European Search Report for PCT/US2020/026396. Mailed Oct. 26, 2022.
Abecasis et al., "Merlin—rapid analysis of dense genetic maps using sparse gene flow trees" Nat Genet. 2002;30(1):97-101.
Anand et al., "Prognostic value of baseline plasma amino-terminal pro-brain natriuretic peptide and its interactions with irbesartan treatment effects in patients with heart failure and preserved ejection fraction: findings from the I-PRESERVE trial" Circ Heart Fail. Sep. 2011;4(5):569-77.
Anand et al., "Interaction Between Spironolactone and Natriuretic Peptides in Patients With Heart Failure and Preserved Ejection Fraction: From the TOPCAT Trial" JACC Heart Fail. Apr. 2017;5(4):241-252.
Andersen et al., "Soluble Urokinase Plasminogen Activator Receptor is a Marker of Dysmetabolism in HIV-Infected Patients Receiving Highly Active Antiretroviral Therapy" J Med Virol. 2008;80(2):209-16.
Arbel et al., "suPAR: A Cardiac Biomarker With a Future?" Can J Cardiol. Oct. 2015;31(10):1223-4.
Backes et al. "Usefulness of suPAR as a biological marker in patients with systemic inflammation or infection: a systematic review" Intensive Care Med. Sep. 2012;38(9):1418-28.
Bellomo et al., "Acute Kidney Injury" Lancet. Aug. 25, 2012;380(9843):756-66.
Benjamin et al., "Heart Disease and Stroke Statistics—2018 Update: A Report From the American Heart Association" Circulation. Mar. 20, 2018;137(12):e67-e492.
Benjamin et al., "Heart Disease and Stroke Statistics—2019 Update: A Report From the American Heart Association" Circulation. Mar. 5, 2019;139(10):e56-e528.
Borné et al., "Increased plasma level of soluble urokinase plasminogen activator receptor is associated with incidence of heart failure but not atrial fibrillation" Eur J Heart Fail. Apr. 2014;16(4):377-83.
Bosiers et al., "Drug-eluting stents in the management of peripheral arterial disease" Vasc Health Risk Manag. 2008;4(3):553-9.
Botha et al., "Soluble urokinase plasminogen activator receptor as a prognostic marker of all-cause and cardiovascular mortality in a black population" Int J Cardiol. Apr. 1, 2015;184:631-636.
Bowe et al., "Changes in the US Burden of Chronic Kidney Disease From 2002 to 2016: An Analysis of the Global Burden of Disease Study" JAMA Netw Open. Nov. 2, 2018;1(7):e184412:1-16.

(Continued)

*Primary Examiner* — Zachary C Howard
(74) *Attorney, Agent, or Firm* — David W. Staple; Casimir Jones, S.C.

(57) ABSTRACT

The disclosure is directed to methods for preventing or treating cardiovascular disease and kidney dysfunction in certain patient populations which involve determining the level of soluble urokinase plasminogen activator receptor (suPAR) protein in a sample obtained from a subject, and performing various therapeutic interventions based on the suPAR level in the sample.

4 Claims, 6 Drawing Sheets

(56) References Cited

OTHER PUBLICATIONS

Briet et al., "Vascular actions of aldosterone" J Vasc Res. 2013;50(2):89-99.
Bycroft et al., "The UK Biobank resource with deep phenotyping and genomic data" Nature. Oct. 2018;562(7726):203-209.
Cleland et al., "The perindopril in elderly people with chronic heart failure (PEP-CHF) study" Eur Heart J. Oct. 2006;27(19):2338-45.
Dal Monte et al., "Inhibiting the urokinase-type plasminogen activator receptor system recovers STZ-induced diabetic nephropathy" J Cell Mol Med. Feb. 2019;23(2):1034-1049.
De Bock et al., "Clinical significance of urokinase-type plasminogen activator receptor (uPAR) expression in cancer" Med Res Rev. Jan. 2004;24(1):13-39.
Desch et al., "Linkage analysis identifies a locus for plasma von Willebrand factor undetected by genome-wide association" Proc Natl Acad Sci U S A. Jan. 8, 2013;110(2):588-93.
Detrano et al., "Coronary calcium as a predictor of coronary events in four racial or ethnic groups" N Engl J Med. Mar. 27, 2008;358(13):1336-45.
Devlin et al., "Genomic control, a new approach to genetic-based association studies" Theor Popul Biol. Nov. 2001;60(3):155-66.
Diederichsen et al., "Prognostic value of suPAR and hs-CRP on cardiovascular disease" Atherosclerosis. Apr. 2018;271:245-251.
Drechsler et al., "Soluble Urokinase Plasminogen Activator Receptor and Outcomes in Patients with Diabetes on Hemodialysis" Clin J Am Soc Nephrol. Aug. 7, 2017;12(8):1265-1273.
Eapen et al., "Soluble urokinase plasminogen activator receptor level is an independent predictor of the presence and severity of coronary artery disease and of future adverse events" Am Heart Assoc. Oct. 23, 2014;3(5):e001118:1-10.
Edelmann et al., "Effect of spironolactone on diastolic function and exercise capacity in patients with heart failure with preserved ejection fraction: the Aldo-DHF randomized controlled trial" JAMA. Feb. 27, 2013;309(8):781-91.
Edsfeldt et al., "Soluble urokinase plasminogen activator receptor is associated with inflammation in the vulnerable human atherosclerotic plaque" Stroke. Dec. 2012;43(12):3305-12.
Elinoff et al., "Spironolactone-induced degradation of the TFIIH core complex XPB subunit suppresses NF-κB and AP-1 signalling" Cardiovasc Res. Jan. 1, 2018;114(1):65-76.
Escolar et al., "The effect of an EDTA-based chelation regimen on patients with diabetes mellitus and prior myocardial infarction in the Trial to Assess Chelation Therapy (TACT)" Circ Cardiovasc Qual Outcomes. Jan. 2014;7(1):15-24.
Eugen-Olsen et al., "Plasma suPAR is lowered by smoking cessation: a randomized controlled study" Eur J Clin Invest. Apr. 2016;46(4):305-11.
Eugen-Olsen et al., "The serum level of soluble urokinase receptor is elevated in tuberculosis patients and predicts mortality during treatment: a community study from Guinea-Bissau" Int J Tuberc Lung Dis. Aug. 2002;6(8):686-92.
Eugen-Olsen et al., "Circulating soluble urokinase plasminogen activator receptor predicts cancer, cardiovascular disease, diabetes and mortality in the general population" J Intern Med. Sep. 2010;268(3):296-308.
Fuhrman, B., "The urokinase system in the pathogenesis of atherosclerosis" Atherosclerosis. May 2012;222(1):8-14.
Fujisaka et al., Association between suPAR and cardiac diastolic dysfunction among patients with preserved ejection fraction. Heart Vessels. Nov. 2017;32(11):1327-1336.
Gansevoort et al., "Chronic kidney disease and cardiovascular risk: epidemiology, mechanisms, and prevention" Lancet. Jul. 27, 2013;382(9889):339-52.
Genbank. NCBI Accession No. AAK31795, 2001. 2 pages.
Grundy et al., "2018 AHA/ACC/AACVPR/AAPA/ABC/ACPM/ADA/AGS/APhA/ASPC/NLA/PCNA Guideline on the Management of Blood Cholesterol: A Report of the American College of Cardiology/American Heart Association Task Force on Clinical Practice Guidelines" J Am Coll Cardiol. Jun. 25, 2019;73(24):e285-e350.
Hahm et al., "Bone marrow-derived immature myeloid cells are a main source of circulating suPAR contributing to proteinuric kidney disease" Nat Med. Jan. 2017;23(1):100-106.
Haupt et al., "Healthy lifestyles reduce suPAR and mortality in a Danish general population study" Immun Ageing. Jan. 22, 2019;16:1:1-12.
Hayek et al., "Predicting Mortality in African Americans With Type 2 Diabetes Mellitus: Soluble Urokinase Plasminogen Activator Receptor, Coronary Artery Calcium, and High-Sensitivity C-Reactive Protein" J Am Heart Assoc. May 1, 2018;7(9):e008194:1-10.
Hayek et al., "Soluble Urokinase Plasminogen Activator Receptor and Decline in Kidney Function in Autosomal Dominant Polycystic Kidney Disease" J Am Soc Nephrol. Jul. 2019;30(7):1305-1313.
Hayek et al., "Cardiovascular Disease Biomarkers and suPAR in Predicting Decline in Renal Function: A Prospective Cohort Study" Kidney Int Rep. Feb. 9, 2017;2(3):425-432.
Hayek et al., "Soluble Urokinase Receptor and Chronic Kidney Disease" N Engl J Med. Nov. 12, 2015;373(20):1916-25.
Hayek et al., "Soluble Urokinase Receptor and Acute Kidney Injury" N Engl J Med. Jan. 30, 2020;382(5):416-426.
Hayek et al., "A tripartite complex of suPAR, APOL1 risk variants and α v β 3 integrin on podocytes mediates chronic kidney disease" Nat Med. Aug. 2017;23(8):945-953.
Hodges et al., "Effect of simvastatin and ezetimibe on suPAR levels and outcomes" Atherosclerosis. May 2018;272:129-136.
Hogg et al., "Heart failure with preserved left ventricular systolic function; epidemiology, clinical characteristics, and prognosis." J Am Coll Cardiol. Feb. 4, 2004;43(3):317-27.
Huai et al., "Structure of human urokinase plasminogen activator in complex with its receptor" Science. Feb. 3, 2006;311(5761):656-9.
International Search Report and Written Opinion for PCT/US2020/026396. Mailed Jun. 18, 2020. 14 pages.
Jia et al., "Role of mineralocorticoid receptor activation in cardiac diastolic dysfunction" Biochim Biophys Acta Mol Basis Dis. Aug. 2017;1863(8):1-7.
Kang et al., "Biodegradable-polymer drug-eluting stents versus bare metal stents versus durable-polymer drug-eluting stents: a systematic review and bayesian approach network meta-analysis." J Am Coll Cardiol 2013;62:B251 Abstract TCT-831.
Kang et al., "Variance component model to account for sample structure in genome-wide association studies" Nat Genet. Apr. 2010;42(4):348-54.
Khambhati et al., "Immunotherapy for the prevention of atherosclerotic cardiovascular disease: Promise and possibilities" Atherosclerosis. Sep. 2018;276:1-9.
Ko et al., "Cohort profile: the Emory Cardiovascular Biobank (EmCAB)" BMJ Open. Dec. 29, 2017;7(12):e018753:1-7.
Koller et al., "Soluble Urokinase-Type Plasminogen Activator Receptor Improves Risk Prediction in Patients With Chronic Heart Failure" JACC Heart Fail. Apr. 2017;5(4):268-277.
Lameire et al., "Acute kidney injury: an increasing global concern" Lancet. Jul. 13, 2013;382(9887):170-9.
Laurie et al., "Detectable clonal mosaicism from birth to old age and its relationship to cancer" Nat Genet. May 6, 2012;44(6):642-50.
Lawn et al., "Plasma levels of soluble urokinase-type plasminogen activator receptor (suPAR) and early mortality risk among patients enrolling for antiretroviral treatment in South Africa" BMC Infect Dis. May 17, 2007;7:41:1-8.
Levey et al., "A new equation to estimate glomerular filtration rate" Ann Intern Med. May 5, 2009;150(9):604-12.
Li et al., "An ultrasensitive sandwich-type electrochemical immunosensor based on signal amplification strategy of gold nanoparticles functionalized magnetic multi-walled carbon nanotubes loaded with lead ions" Biosens Bioelectron. Jun. 15, 2015;68:626-632.
Luo et al., "Soluble Urokinase-Type Plasminogen Activator Receptor in Black Americans with CKD" Clin J Am Soc Nephrol. Jul. 6, 2018;13(7):1013-1021.
Lyngbæk et al., "Cardiovascular risk prediction in the general population with use of suPAR, CRP, and Framingham Risk Score" Int J Cardiol. Sep. 10, 2013;167(6):2904-11.

(56) References Cited

OTHER PUBLICATIONS

Machiela et al., "Characterization of large structural genetic mosaicism in human autosomes" Am J Hum Genet. Mar. 5, 2015;96(3):487-97.
Mackinnon et al., "Statistical analysis for identifying mediating variables in public health dentistry interventions" J Public Health Dent. Winter 2011;71 Suppl 1(Suppl 1):S37-46.
Malhotra et al., "Ultrasensitive detection of cancer biomarkers in the clinic by use of a nanostructured microfluidic array" Anal Chem. Jul. 17, 2012;84(14):A-G.
Martel et al., "Inertial focusing in microfluidics" Annu Rev Biomed Eng. Jul. 11, 2014;16:371-96.
Martin et al., "Beta-blockers and inhibitors of the renin-angiotensin aldosterone system for chronic heart failure with preserved ejection fraction" Cochrane Database Syst Rev. Jun. 28, 2018;6(6):CD012721. 199 pages.
Massie et al., "Irbesartan in patients with heart failure and preserved ejection fraction" N Engl J Med. Dec. 4, 2008;359(23):2456-67.
Maxwell et al., "Overexpression of PCSK9 accelerates the degradation of the LDLR in a post-endoplasmic reticulum compartment" Proc Natl Acad Sci U S A. Feb. 8, 2005;102(6):2069-74.
McCullough et al., "Contrast-Induced Acute Kidney Injury" J Am Coll Cardiol. Sep. 27, 2016;68(13):1465-1473.
Miller et al., "Advanced Percutaneous Mechanical Circulatory Support Devices for Cardiogenic Shock" Crit Care Med. Nov. 2017;45(11):1922-1929.
Mills et al., "Do high blood folate concentrations exacerbate metabolic abnormalities in people with low vitamin B-12 status?" Am J Clin Nutr. Aug. 2011;94(2):495-500.
Miura et al., "Anti-inflammatory effect of spironolactone on human peripheral blood mononuclear cells" J Pharmacol Sci. Jul. 2006;101(3):256-9.
Mottram et al., "Effect of aldosterone antagonism on myocardial dysfunction in hypertensive patients with diastolic heart failure" Circulation. Aug. 3, 2004;110(5):558-65.
Myhre et al., "Cardiac Troponin I and Risk of Cardiac Events in Patients With Heart Failure and Preserved Ejection Fraction" Circ Heart Fail. Nov. 2018;11(11):e005312:1-9.
Nayor et al., "Left Ventricular Diastolic Dysfunction in the Community: Impact of Diagnostic Criteria on the Burden, Correlates, and Prognosis" J Am Heart Assoc. Jun. 1, 2018;7(11):e008291:1-9.
Oppi et al., "Mouse Models for Atherosclerosis Research—Which Is My Line?" Front Cardiovasc Med. Apr. 12, 2019;6:46:1-8.
Owan et al., "Epidemiology of diastolic heart failure." Prog Cardiovasc Dis. Mar.-Apr. 2005; 47(5):320-32.
Owan et al., "Trends in Prevalence and Outcome of Heart Failure with Preserved Ejection Fraction." N Engl J Med. Jul. 20, 2006;355(3):251-9.
Pakula et al., "Acute Kidney Injury in the Critically Ill Patient: A Current Review of the Literature" J Intensive Care Med. Jun. 2016;31(5):1-6.
Paulus et al., "A novel paradigm for heart failure with preserved ejection fraction: comorbidities drive myocardial dysfunction and remodeling through coronary microvascular endothelial inflammation" J Am Coll Cardiol. Jul. 23, 2013;62(4):263-71.
Persson et al., "Soluble urokinase plasminogen activator receptor: a risk factor for carotid plaque, stroke, and coronary artery disease" Stroke. Jan. 2014;45(1):18-23.
Pfeffer et al., "Regional variation in patients and outcomes in the Treatment of Preserved Cardiac Function Heart Failure With an Aldosterone Antagonist (TOPCAT) trial" Circulation. Jan. 6, 2015;131(1):34-42.
Pinto-Sietsma et al., "Urinary albumin excretion is associated with renal functional abnormalities in a nondiabetic population" J Am Soc Nephrol. Oct. 2000;11(10):1882-1888.
Pitt et al., "Spironolactone for heart failure with preserved ejection fraction" N Engl J Med. Apr. 10, 2014;370(15):1383-92.
Plewes et al., Correlation of biomarkers for parasite burden and immune activation with acute kidney injury in severe falciparum malaria. Malar J. Mar. 12, 2014;13:91.
Polonsky et al., "Coronary artery calcium score and risk classification for coronary heart disease prediction" JAMA. Apr. 28, 2010;303(16):1610-6.
Powers et al., "Protein analytical assays for diagnosing, monitoring, and choosing treatment for cancer patients" J Healthc Eng. Dec. 2012;3(4):503-534.
Purcell et al., "PLINK: a tool set for whole-genome association and population-based linkage analyses" Am J Hum Genet. Sep. 2007;81(3):559-75.
Rabanni et al., "An anti-urokinase plasminogen activator receptor antibody (ATN-658) blocks prostate cancer invasion, migration, growth, and experimental skeletal metastasis in vitro and in vivo" Neoplasia. Oct. 2010;12(10):778-88.
Rabb et al., "Inflammation in AKI: Current Understanding, Key Questions, and Knowledge Gaps" J Am Soc Nephrol. Feb. 2016;27(2):371-9.
Rabna et al., "Utility of the plasma level of suPAR in monitoring risk of mortality during TB treatment" PLoS One. 2012;7(8):e43933:1-6.
Redfield et al., "Isosorbide Mononitrate in Heart Failure with Preserved Ejection Fraction" N Engl J Med. Dec. 10, 2015;373(24):1-11.
Rewa et al., "Acute kidney injury-epidemiology, outcomes and economics" Nat Rev Nephrol. Apr. 2014;10(4):193-207.
Ridker et al., "Interleukin-1β inhibition and the prevention of recurrent cardiovascular events: rationale and design of the Canakinumab Anti-inflammatory Thrombosis Outcomes Study (CANTOS)" Am Heart J. Oct. 2011;162(4):597-605.
Ridker et al., "Rosuvastatin to prevent vascular events in men and women with elevated C-reactive protein" N Engl J Med. Nov. 20, 2008;359(21):2195-207.
Ridker et al., "Antiinflammatory Therapy with Canakinumab for Atherosclerotic Disease" N Engl J Med. Sep. 21, 2017;377(12):1-13.
Ridker et al., "Relationship of C-reactive protein reduction to cardiovascular event reduction following treatment with canakinumab: a secondary analysis from the CANTOS randomised controlled trial" Lancet. Nov. 13, 2017;391(10118):319-328.
Ridker, P.M., "The JUPITER trial: results, controversies, and implications for prevention" Circ Cardiovasc Qual Outcomes. May 2009;2(3):279-85.
Ryan et al., "Mechanical Circulatory Support in the Cardiac Catheterization Laboratory for Cardiogenic Shock" Korean Circ J. Mar. 2019;49(3):197-213.
Saran et al., "US Renal Data System 2018 Annual Data Report: Epidemiology of Kidney Disease in the United States" Am J Kidney Dis. Mar. 2019;73(3 Suppl 1):S7-S8.
Savarese et al., "Global Public Health Burden of Heart Failure" Card Fail Rev. Apr. 2017;3(1):7-11.
Schaefer et al., "Association of Serum Soluble Urokinase Receptor Levels With Progression of Kidney Disease in Children" JAMA Pediatr. Nov. 6, 2017;171(11):e172914:e1-e9.
Schneider et al., "The prognostic value of the suPARnostic ELISA in HIV-1 infected individuals is not affected by uPAR promoter polymorphisms" BMC Infect Dis. Nov. 16, 2007;7:134:1-7.
Schubert et al., "Ultra-sensitive protein detection via Single Molecule Arrays towards early stage cancer monitoring" Sci Rep. Jun. 8, 2015;5:11034:1-8.
Schulz et al., "Soluble Urokinase-type Plasminogen Activator Receptor (suPAR) and Impaired Kidney Function in the Population-based Malmö Diet and Cancer Study" Kidney Int Rep. Mar. 2017;2(2):1-9.
Schutte et al., "Exploring soluble urokinase plasminogen activator receptor and its relationship with arterial stiffness in a bi-ethnic population: the SAfrEIC-study" Thromb Res. Aug. 2012;130(2):273-7.
Sehestedt et al., "Soluble urokinase plasminogen activator receptor is associated with subclinical organ damage and cardiovascular events" Atherosclerosis. May 2011;216(1):237-43.
Sekula et al., "Mendelian Randomization as an Approach to Assess Causality Using Observational Data" J Am Soc Nephrol. Nov. 2016;27(11):1-13.

(56) References Cited

OTHER PUBLICATIONS

Shah et al., "Phenotype-Specific Treatment of Heart Failure With Preserved Ejection Fraction: A Multiorgan Roadmap" Circulation. Jul. 5, 2016;134(1):73-90.

Solomon et al., "Angiotensin-Neprilysin Inhibition in Heart Failure with Preserved Ejection Fraction" N Engl J Med. Oct. 24, 2019;381(17):1-11.

Sørensen et al., "Soluble urokinase plasminogen activator receptor is in contrast to high-sensitive C-reactive-protein associated with coronary artery calcifications in healthy middle-aged subjects" Atherosclerosis. Nov. 2014;237(1):60-6.

Stewart et al., "Mechanical circulatory support for advanced heart failure: patients and technology in evolution" Circulation. Mar. 13, 2012;125(10):1304-15.

Stone et al., "Bioinformatic and genetic association analysis of microRNA target sites in one-carbon metabolism genes" PLoS One. 2011;6(7):e21851p. 1-7.

Ter Maaten et al., "Connecting heart failure with preserved ejection fraction and renal dysfunction: the role of endothelial dysfunction and inflammation" Eur J Heart Fail. Jun. 2016;18(6):588-98.

Theilade et al., "Soluble urokinase plasminogen activator receptor levels are elevated and associated with complications in patients with type 1 diabetes" J Intern Med. Mar. 2015;277(3):1-10.

Thunø et al., "suPAR: the molecular crystal ball." Dis Markers. 2009; 27(3):157-72.

Tran et al., "PGC1α drives NAD biosynthesis linking oxidative metabolism to renal protection" Nature. Mar. 24, 2016;531(7595):528-32.

Vasan et al., "Prevalence, clinical features and prognosis of diastolic heart failure: an epidemiologic perspective." J Am Coll Cardiol. Dec. 1995; 26(7):1565-74.

Wang et al., "Cardiac surgery-associated acute kidney injury: risk factors, pathophysiology and treatment" Nat Rev Nephrol. Nov. 2017;13(11):697-711.

Webster et al., "Chronic Kidney Disease" Lancet. Mar. 25, 2017;389(10075):1238-1252.

Wei et al., "Circulating urokinase receptor as a cause of focal segmental glomerulosclerosis" Nat Med. Jul. 31, 2011;17(8):952-60.

Wei et al., "uPAR isoform 2 forms a dimer and induces severe kidney disease in mice" J Clin Invest. Apr. 2, 2019;129(5):1946-1959.

Wei et al., "Modification of kidney barrier function by the urokinase receptor" Nat Med. Jan. 2008;14(1):55-63.

Willer et al., "METAL: fast and efficient meta-analysis of genomewide association scans" Bioinformatics. Sep. 1, 2010;26(17):2190-1.

Yang et al., "GCTA: a tool for genome-wide complex trait analysis" Am J Hum Genet. Jan. 7, 2011;88(1):76-82.

Yoo et al., "Sphingomyelinase-like phosphodiesterase 3b expression levels determine podocyte injury phenotypes in glomerular disease" J Am Soc Nephrol. Jan. 2015;26(1):133-47.

Yusuf et al., "Effects of candesartan in patients with chronic heart failure and preserved left-ventricular ejection fraction: the CHARM-Preserved Trial" Lancet. Sep. 6, 2003;362(9386):777-81.

\* cited by examiner

USE OF SOLUBLE UROKINASE PLASMINOGEN ACTIVATOR RECEPTOR LEVELS TO INDICATE PREVENTION OF CARDIOVASCULAR DISEASE WITH A STATIN

CROSS REFERENCE TO RELATED APPLICATIONS

This application is a continuation of U.S. patent application Ser. No. 16/838,711, filed Apr. 2, 2020, which claims the benefit of U.S. Provisional Patent Application No. 62/828,187, filed on Apr. 2, 2019, each of which is incorporated by reference herein.

FIELD

Provided herein are methods for guiding the treatment of cardiovascular diseases by measuring soluble urokinase plasminogen activator receptor (suPAR) protein levels in a subject in need thereof.

BACKGROUND

The management of patients with cardiovascular diseases is often fraught with challenges in maximizing benefit and minimize risks of therapies, largely due to the significant heterogeneity amongst patients with similar disease processes. Biomarkers that reflect disease processes not accounted for by traditional clinical evaluation and that strongly predict outcomes including death, myocardial infarction, heart failure, and kidney disease would be valuable for guiding treatment decisions and personalizing therapy. Patients with cardiovascular disease represent a complex and heterogenous patient population, and there is a need for methods to determine which patients benefit preferentially from specific therapies; leading to overall more cost-effective and personalized treatment plans. The present disclosure provides such methods.

SUMMARY

The disclosure provides a method for treating cardiovascular disease in a subject, which method comprises: (a) determining the level of soluble urokinase plasminogen activator receptor (suPAR) protein in a sample obtained from a subject suffering from cardiovascular disease; (b) performing bypass surgery on the subject if the level of suPAR in the sample is greater than a threshold level; or (c) stenting one or more coronary arteries in the subject if the level of suPAR in the sample is less than the threshold level (e.g., about 3 ng/mL), whereby the cardiovascular disease in the subject is treated. In some embodiments, the cardiovascular disease is coronary artery disease (CAD), such as triple-vessel disease (TVD). In some embodiments, stenting is performed by percutaneous coronary intervention (PCI).

The disclosure also provides a method of treating stable cardiovascular disease or preventing cardiovascular disease in a subject, which method comprises: (a) measuring the level of soluble urokinase plasminogen activator receptor (suPAR) protein in a sample obtained from a subject suffering from stable cardiovascular disease or a subject at high risk for cardiovascular disease; (b) determining that the level of suPAR in the sample is greater than a threshold level (e.g., about 3.0 ng/mL); and (c) administering a statin, an immunomodulatory therapy, and/or an anti-suPAR therapy to the subject, whereby the cardiovascular disease in the subject is treated or prevented. In some embodiments, the subject suffers from stable cardiovascular disease. In some embodiments, the cardiovascular disease is coronary artery disease. In some embodiments, the subject is at high risk for cardiovascular disease and the method prevents cardiovascular disease. In some embodiments, the method comprises administering a statin to the subject. In some embodiments, the method comprises administering an immunomodulatory therapy to the subject, such as methotrexate, metformin, cananikumab, and a mineralocorticoid receptor antagonist. In some embodiments, the method comprises administering an anti-suPAR therapy to the subject, such as a monoclonal antibody that specifically binds to suPAR, or plasmapheresis using suPAR-specific cartridges.

The disclosure also provides a method of preventing or treating cardiovascular disease using chelation therapy, which method comprises: (a) measuring the level of soluble urokinase plasminogen activator receptor (suPAR) protein in a sample obtained from a subject; (b) determining that the level of suPAR in the sample is greater than a threshold level (e.g., about 3 ng/mL) and (c) administering chelation therapy to the subject in the suPAR level is above the threshold level, thereby preventing cardiovascular disease in the subject. In some embodiments, the chelation therapy comprises administering ethylenediaminetetraacetic acid (EDTA), dimercaptosuccinic acid, or dimercaprol to the subject.

The disclosure also provides a method of treating congestive heart failure in a subject with concomitant kidney dysfunction, which method comprises: (a) determining the level of soluble urokinase plasminogen activator receptor (suPAR) protein in a sample obtained from a subject suffering from congestive heart failure with concomitant kidney dysfunction; (b) performing dual organ transplantation of the heart and kidney or mechanical circulatory support on the subject if the level of suPAR in the sample is greater than the threshold level; or (c) performing single organ heart transplantation if the level of suPAR in the sample is less than the threshold level, whereby the congestive heart failure in the subject is treated. In some embodiments, the mechanical circulatory support is a left ventricular assist device, a right ventricular assist device, or a total artificial heart.

The disclosure also provides a method of treating kidney dysfunction in a subject in need thereof, which method comprises: (a) measuring the level of soluble urokinase plasminogen activator receptor (suPAR) protein in a sample obtained from a subject suffering from kidney dysfunction; (b) determining that the level of suPAR in the sample is greater than a threshold level; and (c) administering a treatment for kidney dysfunction to the subject, whereby the kidney dysfunction is treated in the subject.

The disclosure also provides a method of treating heart failure with preserved ejection fraction (HFpEF) in a subject in need thereof, which method comprises: (a) measuring the level of soluble urokinase plasminogen activator receptor (suPAR) protein in a sample obtained from a subject suffering from HFpEF; (b) determining that the level of suPAR in the sample is greater than a threshold level; and (c) administering a HFpEF treatment to the subject, such as mineralocorticoid antagonists, whereby HFpEF is treated in the subject.

In some embodiments of the above-described methods, the sample is blood or urine, and the level of suPAR is determined or measured by immunoassay, immunoprecipitation, Western blot, flow cytometry, or protein microarray.

DEFINITIONS

Figure 1C:
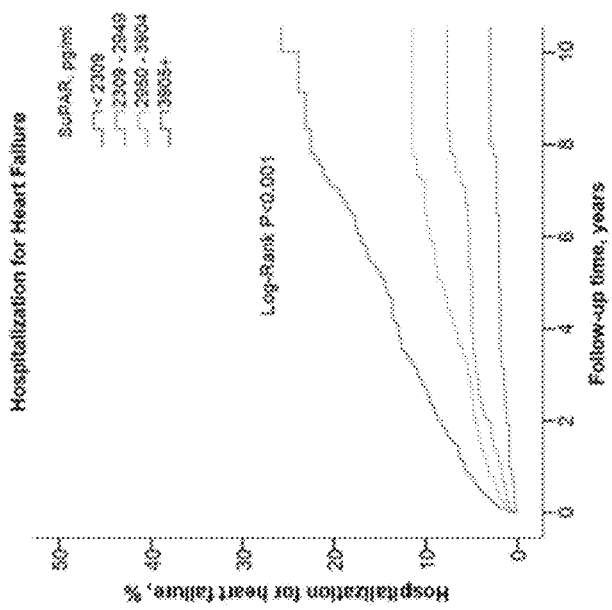
FIGS. 1A-1C are graphs showing the relationship between suPAR levels and the outcomes all-cause death (1A), cardiovascular death (1B), and hospitalization for heart failure (1C). Survival curves are stratified by suPAR quartiles.

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular compositions, methodologies, or protocols described herein, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein, the terms "administration" and "administering" refer to the act of giving a drug, prodrug, therapeutic, or other agent to a subject or in vivo, in vitro, or ex vivo cells, tissues, and organs. Exemplary routes of administration to the human body can be through space under the arachnoid membrane of the brain or spinal cord (intrathecal), the eyes (ophthalmic), mouth (oral), skin (topical or transdermal), nose (nasal), lungs (inhalant), oral mucosa (buccal), ear, rectal, vaginal, by injection (e.g., intravenously, subcutaneously, intratumorally, intraperitoneally, etc.) and the like.

The terms "biomarker" and "biological marker" are used synonymously herein and refer to a defined characteristic that is measured as an indicator of normal biological processes, pathogenic processes, or responses to an exposure or intervention, including therapeutic interventions. In some embodiments, a biomarker may comprise a substance whose detection indicates a particular disease state (e.g., the presence of an antibody may indicate an infection). More specifically, a biomarker may indicate a change in expression or state of a protein that correlates with the risk or progression of a disease, or with the susceptibility of the disease to a particular treatment. The types of substances that may be measured as biomarkers range widely and include, but are not limited to, molecular biomarkers (e.g., nucleic acids, gene products, and proteins), physiologic biomarkers (e.g., blood pressure or blood flow), or anatomic biomarkers (e.g., the structure of a particular organ).

As used herein, the terms "cardiovascular disease" (CVD) or "cardiovascular disorder" are terms used to classify numerous conditions affecting the heart, heart valves, and vasculature (e.g., veins and arteries) of the body and encompass diseases and conditions including, but not limited to arteriosclerosis, atherosclerosis, myocardial infarction, acute coronary syndrome, angina, congestive heart failure, aortic aneurysm, aortic dissection, iliac or femoral aneurysm, pulmonary embolism, primary hypertension, gestational hypertension, pre-eclampsia, atrial fibrillation, stroke, transient ischemic attack, systolic dysfunction, diastolic dysfunction, myocarditis, atrial tachycardia, ventricular fibrillation, endocarditis, arteriopathy, vasculitis, atherosclerotic plaque, vulnerable plaque, acute coronary syndrome, acute ischemic attack, sudden cardiac death, peripheral vascular disease, coronary artery disease (CAD), peripheral artery disease (PAD), and cerebrovascular disease.

The term "cardiovascular event," as used herein, refers to the manifestation of an adverse condition in a subject brought on by cardiovascular disease, such as sudden cardiac death or acute coronary syndromes including, but not limited to, myocardial infarction, gestational hypertension, pre-eclampsia, unstable angina, aneurysm, or stroke. The term "cardiovascular event" can be used interchangeably herein with the term "cardiovascular complication." While a cardiovascular event can be an acute condition, it can also represent the worsening of a previously detected condition to a point where it represents a significant threat to the health of the subject, such as the enlargement of a previously known aneurysm or the increase of hypertension to life threatening levels.

The term "coronary artery disease," as used herein, refers to the narrowing or blockage of the coronary arteries due primarily to atherosclerosis (i.e., buildup of cholesterol and fatty deposits ("plaques") on the inner walls of the arteries). The narrowing or blockage of the coronary arteries results in reduction of blood flow to the heart muscle. Coronary artery disease (also known as "ischemic heart disease (IHD)") is the most common of the cardiovascular diseases, affecting 16.5 million Americans (Heart Disease and Stroke. Statistics 2017 Update: A Report from the American Heart Association Statistics Committee and Stroke Statistics Subcommittee. Circulation. Jan. 25, 2017).

As used herein, the term "diagnosis" encompasses determining the nature of disease in a subject, as well as determining the severity and probable outcome of disease or episode of disease and/or prospect of recovery (prognosis). "Diagnosis" can also encompass diagnosis in the context of rational therapy, in which the diagnosis guides therapy, including initial selection of therapy, modification of therapy (e.g., adjustment of dose and/or dosage regimen or lifestyle change recommendations), and the like.

As used herein, the term "heart failure" refers to a condition in which the heart cannot pump blood efficiently to the rest of the body. Heart failure may be due to damage to the heart or narrowing of the arteries due to infarction, cardiomyopathy (primary or secondary), hypertension, coronary artery disease, valve disease, birth defects, or infection. Heart failure can further be described as chronic, congestive, acute, decompensated, systolic or diastolic. The New York Heart Association (NYHA) classification describes the severity of the disease based on functional capacity of the patient; NYHA class can progress and/or regress based on treatment or lack of response to treatment. In heart failure, "increased severity" of cardiovascular disease refers to the worsening of disease as indicated by increased NYHA classification, to, for example, Class III or Class IV, and "reduced severity" of cardiovascular disease refers to an improvement of the disease as indicated by reduced NYHA classification, from, for example, class III or IV to class II or I.

The term "ejection fraction," as used herein, refers to the fraction of outbound blood pumped from the heart with each heartbeat. It is commonly measured by echocardiogram and serves as a general measure of a subject's cardiac function. Left ventricular ejection fraction (LVEF) is the measurement of how much blood is being pumped out of the left ventricle of the heart (the main pumping chamber) with each contraction. Right ventricular ejection fraction (RVEF) is the measurement of how much blood is being pumped out of the right side of the heart to the lungs for oxygen. Typically, the term "ejection fraction" refers to left ventricular ejection fraction. Patients with an ejection fraction of 50 percent or higher are classified as having "heart failure with preserved ejection fraction" (HFpEF), whereas patients with an ejection fraction of less than 50 percent are classified as having "heart failure with reduced ejection fraction" (HFrEF) (see, e.g., Owan et al., N. Engl. J. Med., 355: 251-259 (2006); Hogg et al., J. Am. Coll. Cardiol., 43(3):317-2 (2004); Owan T, Prog. Cardiovasc. Dis., 47: 320-332 (2005); and Vasan R. S. et al., J. Am. Coll. Cardiol., 26: 1565-1574 (1995)).

The terms "individual," "host," "subject," and "patient" are used interchangeably herein and refer to any vertebrate, including, but not limited to, a mammal (e.g., cow, pig, camel, llama, horse, goat, rabbit, sheep, hamsters, guinea pig, cat, dog, rat, and mouse, a non-human primate (for example, a monkey, such as a cynomolgus monkey, chimpanzee, etc.) and a human). Preferably, the subject is a human. The terms "individual," "host," "subject," and "patient" are used herein irrespective of whether the subject has or is currently undergoing any form of treatment.

The terms "increased," "increase," and "elevated" may be used interchangeably herein and refer to an amount or a concentration in a sample that is higher or greater than a predetermined level or range, such as a typical or normal level found in a control group or control sample, or is higher or greater than another reference level or range (e.g., earlier or baseline sample). The terms "decreased," "decrease," "lowered," and "reduced" may be used interchangeably herein and refer to an amount or a concentration in a test sample that is lower or less than a predetermined level or range, such as a typical or normal level found in a control group or control sample, or is lower or less than another reference level or range (e.g., earlier or baseline sample). The term "altered" refers to an amount or a concentration in a sample that is altered (increased or decreased) over a predetermined level or range, such as a typical or normal level found in a control group or control sample, or over another reference level or range (e.g., earlier or baseline sample).

The terms "prevent," "prevention," "prophylactic," and the like refer to completely or partially inhibiting onset of a disease or symptom thereof. A "prophylactically effective amount" of a particular compound, drug, or agent refers to an amount effective, at dosages and for periods of time necessary, to achieve a desired prophylactic result (e.g., prevention of disease onset).

As used herein, the terms "treatment," "treating," and the like refer to obtaining a desired pharmacologic and/or physiologic effect. Preferably, the effect is therapeutic, i.e., the effect partially or completely cures a disease and/or adverse symptom attributable to the disease. A "therapeutically effective amount" of a particular compound, drug, or agent refers to an amount effective, at dosages and for periods of time necessary, to achieve a desired therapeutic result. A therapeutically effective amount may vary according to factors such as the disease state, age, sex, and weight of a subject.

DETAILED DESCRIPTION

The present disclosure is predicated, at least in part, on the discovery that the levels of soluble urokinase plasminogen activator receptor (suPAR) levels in blood are strongly predictive of several outcomes in cardiovascular disease patient populations, including death, myocardial infarction, heart failure and kidney disease, beyond traditionally measured markers of risk; and reflect a pathway of disease not accounted for by traditional testing. It has also been found that increased suPAR levels are predictive of kidney dysfunction and heart failure with preserved ejection fraction (HFpEF). In addition, measuring suPAR levels in hospitalized patients prior to discharge may help distinguish patients requiring earlier follow-up (e.g., patients with high suPAR) and/or initiation of telehealth monitoring strategies from patients who will benefit from delayed follow-up (e.g., patients with low suPAR). Thus, the use of suPAR as a biomarker in CVD patients will allow clinicians to better allocate resources and reduce hospitalization, thus improving the cost effectiveness of care.

Soluble urokinase plasminogen activator receptor (suPAR) (NCBI Accession No. AAK31795) is the circulating form of a glycosyl-phosphatidylinositol-anchored three-domain membrane protein that is expressed on a variety of cells, including immunologically active cells, endothelial cells, podocytes, keratinocytes, fibroblasts, smooth muscle cells, megakaryocytes, and certain tumor cells (Thuno et al., *Disease Markers*, 27: 157-172 (2009); Wei et al., *Nat Med*, 14: 55-63 (2008); and Huai et al., *Science*, 311: 656-659 (2006)). Both the circulating and membrane-bound forms of suPAR are directly involved in the regulation of cell adhesion and migration through binding of integrins (Thuno et al., supra). The circulating form is produced by cleavage of membrane-bound urokinase-type plasminogen activator receptor and is readily detected in plasma, serum, urine, and other bodily fluids. Elevated suPAR levels have been associated with poor outcomes in various patient populations (see, e.g., Theilade et al., *J Intern Med*, 277: 362-371 (2015); Yoo et al., *J Am Soc Nephrol*, 26: 133-147 (2015); de Bock C E and Wang Y., *Med Res Rev*, 24: 13-39 (2004); Backes et al., *Intensive Care Med*, 38: 1418-1428 (2012); Borné et al., *Eur J Heart Fail*, 16: 377-383 (2014); Eugen-Olsen et al., *J Intern Med*, 268: 296-308 (2010); Fuhrman B., *Atherosclerosis*, 222: 8-14 (2012); Lyngbok et al., *Int J Cardiol*, 167: 2904-2911 (2013); and Eapen et al., *J Am Heart Assoc*, 3: e001118-e001118 (2014)). Increased activation of the immune system leads to increased serum suPAR levels, which has been documented in several pathological conditions, including paroxysmal nocturnal hemoglobinuria, human immunodeficiency virus type 1 (HIV-1) infection, malaria, pneumococcal and *Streptococcus pneumonia* bacteraemia, sepsis, bacterial and viral CNS infection, active tuberculosis (TB) and also in various types of solid tumors (e.g., non-small cell lung cancer, breast, colorectal, prostate, and ovarian cancer) (Thuno et al., supra). suPAR also has been implicated in the pathogenesis of kidney disease, specifically focal segmental glomerulosclerosis and diabetic nephropathy, through interference with podocyte migration and apoptosis (Hayek et al., *N Engl J Med,* 373: 1916-1925 (2015)). Furthermore, high blood concentrations of suPAR independently predict high mortality in both patients and healthy individuals (Eugen-Olsen et al., *Int J Tuberc Lung Dis,* 6: 686-692 (2002)).

The methods described herein involve measuring and determining the level of suPAR protein in a sample obtained from a subject. The terms "sample" and "biological sample" are used interchangeably herein and refer to bodily fluids such as blood-related samples (e.g., whole blood, serum, plasma, and other blood-derived samples), urine, cerebral spinal fluid, bronchoalveolar lavage, and the like. Another example of a sample is a tissue sample. A biological sample may be fresh or stored (e.g., blood or blood fraction stored in a blood bank). The biological sample may be a bodily fluid expressly obtained for the methods described herein or a bodily fluid obtained for another purpose which can be sub-sampled for the methods of this disclosure. In certain embodiments, the biological sample is whole blood. Whole blood may be obtained from the subject using standard clinical procedures. In other embodiments, the biological sample is plasma. Plasma may be obtained from whole blood samples by centrifugation of anti-coagulated blood, which provides a buffy coat of white cell components and a supernatant of the plasma. In certain embodiments, the biological sample may be serum. Serum may be obtained by centrifugation of whole blood samples that have been collected in tubes that are free of anti-coagulant. The blood is permitted to clot prior to centrifugation. The yellowish-reddish fluid that is obtained by centrifugation is the serum. In another embodiment, the sample may be urine. The sample may be pretreated as necessary by dilution in an appropriate buffer solution, heparinized, concentrated if desired, or fractionated by any number of methods, including but not limited to ultracentrifugation, fractionation by fast performance liquid chromatography (FPLC), or precipitation of apolipoprotein B containing-proteins with dextran sulfate or other methods. Any of a number of standard aqueous buffer solutions at physiological pH, such as phosphate, Tris, or the like, can be used. Methods well-known in the art for collecting, handling and processing urine, blood, serum and plasma, and other body fluids, may be used in the practice of the present disclosure.

The level of suPAR protein may be measured, determined, and/or quantified using any suitable method for protein detection and/or quantification known in the art. Such methods include, but are not limited to, immunoassays (e.g., enzyme linked-immunosorbent assay (ELISA)), protein immunoprecipitation, immunoelectrophoresis, chemical analysis, SDS-PAGE and Western blot analysis, protein immunostaining, electrophoresis analysis, competitive binding assays, functional protein assays, protein microarray, or chromatography or spectrometry methods (e.g., high-performance liquid chromatography (HPLC), mass spectrometry, liquid chromatography-mass spectrometry (LC/MS), capillary electrophoresis (CE)-MS, or any separating front end coupled with MS detection and quantification) (see, e.g., Salvatore Sechi, *Quantitative Proteomics by Mass Spectrometry* (Methods in Molecular Biology) 2nd ed. 2016 Edition, Humana Press (New York, NY, 2009); Daniel Martins-de-Souza, *Shotgun Proteomics: Methods and Protocols* 2014 *edition*, Humana Press (New York, NY, 2014); Jörg Reinders and Albert Sickmann, *Proteomics: Methods and Protocols* (Methods in Molecular Biology) 2009 edition, Humana Press (New York, NY, 2009); and Jörg Reinders, *Proteomics in Systems Biology: Methods and Protocols* (Methods in Molecular Biology) 1st ed. 2016 edition, Humana Press (New York, NY, 2009)).

In some embodiments, suPAR may be present in the sample at low levels that may not be efficiently detected using conventional methods. In such cases, the suPAR protein may be detected using ultrasensitive methodologies and devices specifically designed for detecting low abundant proteins in a sample. Examples of such methodologies and devices include, but are not limited to, microfluidic analytical systems (such as those described in, e.g., Martel, J. M. and Toner, M., *Annu Rev Biomed Eng.,* 16: 371-96 (2014); Martel et al., *Annu Rev Biomed Eng.,* 16: 371-96 (2014); Malhotra et al., *Anal. Chem.,* 84, 6249-6255 (2012); and U.S. Patent Application Publication 2018/0161775 A1), ultra-sensitive ELISA assays (see, e.g., Schubert et al., *Scientific Reports,* 5: Article number: 11034 (2015)), and nanoparticle-based systems (see, e.g., Li et al., *Biosensors and Bioelectronics,* 68: 626-632 (2015)).

Methods and devices for protein detection and quantification are further described in, e.g., Powers, A. D, and S. P. Palecek, *Journal of Healthcare Engineering,* 3(4): 503-534 (2012), and are available from a variety of commercial sources, any of which may be used in the methods described herein.

In certain embodiments, the methods described herein involves comparing the levels of suPAR in a patient sample with a predetermined value or cutoff. The terms "predetermined cutoff," "cutoff," "predetermined value," "reference level," and "threshold level," as used herein, refer to an assay cutoff value that is used to assess diagnostic, prognostic, or therapeutic efficacy results by comparing the assay results against the predetermined cutoff/level, where the predetermined cutoff/value already has been linked or associated with various clinical parameters (e.g., presence of disease, stage of disease, severity of disease, progression, non-progression, improvement of disease, etc.). The disclosure provides exemplary predetermined levels and reference levels. However, it is well-known that cutoff values may vary depending on the nature of the detection method or assay. Whereas the precise value of the predetermined cutoff/value may vary between assays, the correlations as described herein should be generally applicable.

The predetermined value can take a variety of forms. For example, the predetermined value can be single cut-off value, such as a median or mean. The predetermined value can be established based upon comparative groups, such as where the risk of coronary artery disease in one defined group is double the risk in another defined group. In yet another alternative, the predetermined value can be a range, for example, where the tested population is divided equally (or unequally) into groups, such as a low-risk group, a medium-risk group, and a high-risk group, or into quadrants, the lowest quadrant being individuals with the lowest risk and the highest quadrant being individuals with the highest risk.

The predetermined value can depend upon the particular population selected. For example, an apparently healthy population will have a different normal range of biomarker expression levels than will a population comprised of patients with symptoms of cardiovascular disease or heart failure. In another embodiment, a population comprised of patients with congestive heart failure will have a different range of suPAR expression levels than will a population of patients with stable cardiovascular disease. Accordingly, the predetermined values selected may take into account the disease category in which an individual is grouped. Appropriate ranges and categories can be selected by those of ordinary skill in the art using routine methods. In some embodiments, an algorithm may be used to determine a predetermined value or threshold for decision making. Such an algorithm may consider a variety of factors, including, for example, (i) the age of the subject (e.g., higher threshold at higher age), (ii) renal function (e.g., lower threshold with better renal function because the kidneys are actively clearing suPAR), and (iii) gender (e.g., about 3 ng/mL suPAR (male) and about 4 ng/mL suPAR (female)).

It will be appreciated that a "normal" or "baseline" level of suPAR protein in a sample obtained from a subject (e.g., a human subject) will vary depending on a variety of factors, such as the subject's gender, age, overall health, the sample type (e.g., whole blood, serum, etc.), the suPAR isoform measured, and the assay used for measuring suPAR levels. Generally, a normal level of suPAR in human blood (or blood fraction) is from about 2.5 ng/mL to about 5.0 ng/mL (e.g., about 2.5 ng/mL, about 3.0 ng/mL, about 3.5 ng/mL, about 4.0 ng/mL, about 4.5 ng/mL, or about 5.0 ng/mL). In some embodiments, a normal level of suPAR in human blood is less than 3.0 ng/mL (e.g., 2.9 ng/mL, 2.8 ng/mL, 2.7 ng/mL, 2.6 ng/mL, 2.5 ng/mL, 2.4 ng/mL, 2.3 ng/mL, 2.2 ng/mL, 2.1 ng/mL, 2.0 ng/mL, 1.9 ng/mL, 1.8 ng/mL, 1.7 ng/mL, 1.6 ng/mL, 1.5 ng/mL, 1.4 ng/mL, 1.3 ng/mL, 1.2 ng/mL, 1.1 ng/mL, 1.0 ng/mL, 0.9 ng/mL, 0.8 ng/mL, 0.7 ng/mL, 0.6 ng/mL, 0.5 ng/mL, 0.4 ng/mL, 0.3 ng/mL, 0.2 ng/mL, 0.1 ng/mL, 0.01 ng/mL, or less) (see, e.g., Rabna et al., *PLoS One*, 7(8): e43933 (2012); Lawn et al., *BMC Infect Dis.*, 7: 41 (2007); and Schneider et al., *BMC Infectious Diseases*, 7: 134 (2007)). It will be appreciated that the normal level of suPAR in men is about 2.1 ng/mL and in women is about 2.5 ng/mL. A suPAR level that is higher than the normal range may be indicative of a pathological condition, such as kidney disease or cardiovascular disease. In other words, certain disease states may be indicated by blood suPAR protein levels greater than any suPAR level within the normal range of 2.5 ng/mL to about 5.0 ng/mL. For example, certain disease states may be indicated by blood suPAR protein levels greater than about 2.5 ng/mL (e.g., about 2.75 ng/mL, about 2.8 ng/mL, about 2.9 ng/mL, about 2.95 ng/mL, or greater), preferably greater than about 3.0 ng/mL (e.g., 3.5 ng/mL, 4.0 ng/mL, 4.5 ng/mL, or greater), and more preferably greater than about 5.0 ng/mL (e.g., 5.5 ng/mL, 6.0 ng/mL, 6.5 ng/mL, 7.0 ng/mL, 7.5 ng/mL, 8.0 ng/mL, 8.5 ng/mL, 9.0 ng/mL, 9.5 ng/mL, 10.0 ng/mL, 10.5 ng/mL, 15 ng/mL, 20 ng/mL, or greater). Furthermore, in patient populations which already exhibit high suPAR levels (e.g., cardiovascular patients), further elevation of suPAR levels within patient subpopulations may guide particular therapeutic interventions (e.g., bypass versus stenting), as discussed herein.

The level of suPAR protein may be considered "elevated" if the level measured is above a predetermined threshold level. In one embodiment, such a threshold level can be set to the 90th-percentile or to the 95th-percentile of a healthy control population. Preferably, the threshold level is established at the 95th-percentile of a healthy control population. In some embodiments, a particular therapeutic decision or risk assessment for a subject suffering from, or at risk of suffering from, cardiovascular disease is indicated when the level of suPAR is at least 2-fold greater (e.g., 2, 5, 10, 15, 20, 25, 30, 35, 40, 45, 50-fold, or greater) than a predetermined normal level of suPAR.

In some embodiments, the disclosure provides a method for treating cardiovascular disease in a subject, which method comprises: (a) determining the level of soluble urokinase plasminogen activator receptor (suPAR) protein in a sample obtained from a subject suffering from cardiovascular disease; (b) performing bypass surgery on the subject if the level of suPAR in the sample is greater than a threshold level (e.g., about 3 ng/mL); or (c) stenting one or more coronary arteries in the subject if the level of suPAR in the sample is less than the threshold level (e.g., about 3 ng/ml), whereby the cardiovascular disease in the subject is treated. In some embodiments, the cardiovascular disease is coronary artery disease (as defined above). The coronary artery disease may be of any stage or severity. Coronary artery disease severity typically is determined by a number of factors, including but not limited to, left ventricular function, anatomic extent and severity of coronary atherosclerosis (e.g., the number of vessels with significant obstructive coronary disease), severity of ischemia, tempo and severity of angina and/or the presence of recent plaque rupture, and the patient's general health and noncoronary comorbid conditions. In some embodiments, the subject suffers from coronary artery disease with significant obstructive coronary disease in one, two, three, or four coronary blood vessels (e.g., single-, double-, triple-vessel, or quadruple-vessel disease). In one embodiment, the subject suffers from triple-vessel disease (TVD).

In some embodiments, the method involves performing bypass surgery on the subject if the level of suPAR in the sample is greater than a threshold level (e.g., about 3 ng/mL). The terms "bypass," "bypass surgery," "coronary artery bypass surgery," "coronary artery bypass graft (CABG) surgery," and "heart bypass," are used interchangeably herein and refer to a surgical procedure to restore normal blood flow to an obstructed coronary artery. CABG typically is performed to relieve angina unsatisfactorily controlled by maximum tolerated anti-ischemic medication, to prevent or relieve left ventricular dysfunction, and/or to reduce the risk of death. The surgery is usually performed with the heart stopped, necessitating the usage of cardiopulmonary bypass. CABG is often indicated when coronary arteries have a 50 to 99 percent obstruction. The obstruction being bypassed is typically due to arteriosclerosis, atherosclerosis, or both. The terms "single bypass," "double bypass," "triple bypass," "quadruple bypass," and "quintuple bypass" refer to the number of coronary arteries bypassed in the procedure. For example, a double bypass means two coronary arteries are bypassed (e.g., the left anterior descending (LAD) coronary artery and right coronary artery (RCA)); a triple bypass means three vessels are bypassed (e.g., LAD, RCA and left circumflex artery (LCX)); a quadruple bypass means four vessels are bypassed (e.g., LAD, RCA, LCX and first diagonal artery of the LAD), etc. Left main coronary artery obstruction requires two bypasses, one to the LAD and one to the LCX.

In other embodiments, the method involves stenting one or more coronary arteries in the subject if the level of suPAR in the sample is less than a threshold level (e.g., about 3 ng/mL). The term "stenting," as used herein, refers to the placement of a stent into a coronary artery. A "stent" is a tubular support placed temporarily inside a blood vessel, canal, or duct to aid healing or relieve an obstruction. Stenting is typically performed by percutaneous coronary intervention (PCI), which is a non-surgical procedure used to treat narrowing (stenosis) of coronary arteries. PCI, also known as "coronary angioplasty," requires the insertion of a catheter tube and injection of contrast dye, usually iodinebased, into coronary arteries (referred to as "cardiac catheterization"). PCI may be used to relieve symptoms of coronary artery disease or to reduce heart damage during or after a heart attack. The most prevalent stents used in the art are drug-eluting metal stents (DES), which have shown some benefits relative to bare metal stents with respect to early incidences of restenosis (Kang et al., *J Am Coll Cardiol.*, 62(2): B251 (2014); Bosiers et al., *Vasc Health Risk Manag.*, 4(43): 553 (2008)).

In some embodiments, the disclosure provides a method of treating stable cardiovascular disease or preventing cardiovascular disease in a subject, which method comprises: (a) measuring the level of soluble urokinase plasminogen activator receptor (suPAR) protein in a sample obtained from a subject suffering from stable cardiovascular disease or a subject at high risk for cardiovascular disease; (b) determining that the level of suPAR in the sample is greater than a threshold level (e.g., about 2.5 ng/mL); and (c) administering a statin, an immunomodulatory therapy, and/or an anti-suPAR therapy to the subject, whereby the cardiovascular disease in the subject is treated or prevented. Descriptions of measuring and detecting suPAR, the sample, the subject, and components thereof described above also are applicable to those same aspects of the aforementioned method of treating stable cardiovascular disease or preventing cardiovascular disease in a subject.

A cardiovascular disease may be considered "stable" if a patient is asymptomatic, or when symptoms, if present, are manageable with either medical or revascularization therapy. In some embodiments, the cardiovascular disease is coronary artery disease. "Stable coronary artery disease" is generally characterized by episodes of reversible myocardial demand/supply mismatch, related to ischemia or hypoxia, which are usually inducible by exercise, emotion or other stress and are reproducible, but such episodes may also occur spontaneously. Such episodes of ischemia/hypoxia are commonly associated with transient chest discomfort (angina pectoris). SCAD also includes the stabilized, often asymptomatic, phases that follow an acute coronary syndrome (ACS) (2013 *ESC Guidelines on the Management of Stable Coronary Artery Disease*, The Task Force on the Management of Stable Coronary Artery Disease of the European Society of Cardiology, *European Heart Journal*, 34, 2949-3003(2013)).

In some embodiments, the subject is at high risk for developing cardiovascular disease, and the method prevents cardiovascular disease in the subject. A subject is considered "high risk" for developing cardiovascular disease, such as coronary artery disease, as a result of various conditions and behaviors including, but not limited to, high blood pressure, high cholesterol, diabetes, obesity, physical inactivity, unhealthy diet, smoking, and heavy alcohol consumption. A family history of cardiovascular disease, as well as age, race, and gender also are risk factors for heart disease. The term "high risk," as used herein, is defined as greater than a 25% chance, preferably greater than or equal to a 30% chance, and more preferably greater than a 35% chance of a subject developing cardiovascular disease. The term "low risk," as used herein, is defined as less than or equal to a 10% chance, preferably less than a 5% chance, and more preferably less than a 2% chance of a subject developing cardiovascular disease. The term "moderate risk," as used herein, is defined as greater than a 10% and less than a 30% chance of a subject developing cardiovascular disease. The terms "risk assessment," "risk classification," "risk identification," and "risk stratification," as used herein, refers to the evaluation of factors including biomarkers, to predict the risk of occurrence of future events in a subject including disease onset or disease progression, so that treatment decisions regarding the subject may be made on a more informed basis.

In some embodiments, the method involves determining that the level of suPAR in the sample is greater than a threshold level (e.g., about 2.5 ng/mL; as described herein), and administering a statin, and immunomodulatory therapy, and/or an anti-suPAR therapy to the subject, whereby the cardiovascular disease in the subject is treated or prevented. Statins are a class of lipid-lowering drugs which inhibit HMG-CoA reductase and block the pathway for synthesizing cholesterol in the liver. Statins include, but are not limited to, atorvastatin (LIPITOR), fluvastatin (LESCOL), lovastatin (ALTOPREV), pitavastatin (LIVALO), pravastatin (PRAVACHOL), rosuvastatin (CRESTOR), and simvastatin (ZOCOR). The terms "immunomodulatory therapy" and "immunotherapy" are used interchangeably herein and refer to the treatment or prevention of a disease or condition by inducing, enhancing, suppressing or otherwise modifying an immune response. Immune dysregulation and inflammation contribute to the development of atherosclerotic plaques and their progression to acute coronary syndromes. In addition, increased circulating levels of biomarkers of systemic inflammation (e.g., high sensitivity C-reactive protein (hsCRP)) are correlated with a higher cardiovascular risk. Thus, targeting specific inflammatory pathways implicated in atherosclerotic plaque formation is the subject of ongoing research. Target-specific therapies directed at pro-inflammatory cytokines such as IL-1β, IL-6, TNFα, and CCL2 have demonstrated slowing in the progression of atherosclerosis in animal models and improved cardiovascular outcomes in human subjects (Khambhati et al., *Atherosclerosis*, 276: 1-9 (2018)). For example, the monoclonal antibody canakinumab directly targets and neutralizes IL-1β, and was recently shown to be associated with reduced risk of adverse cardiovascular events compared to placebo in a randomized, placebo-controlled trial (Ridker et al., *Am. Heart J.*, 162: 597-605 (2011); and Ridker et al., *N. Engl. J. Med.*, 377: 1119-1131 (2017)). Several other therapies including colchicine, methotrexate, metformin, mineralocorticoid receptor antagonists (e.g., spironolactone or eplerenone), and leukotriene inhibitors demonstrate potential for lowering cardiovascular risk through immunomodulation. Any of the above-described immunotherapies, or other immunotherapeutic known in the art, may be used in connection with the methods described herein. In other embodiments, the method comprises administering an anti-suPAR therapy to the subject, such as a monoclonal antibody that specifically binds to suPAR (as described in, e.g., Rabanni et al., *Neoplasia*, 12(10): 778-788 (2010)), or plasmapheresis using suPAR-specific cartridges.

In some embodiments, the disclosure provides a method of treating or preventing cardiovascular disease in a subject using chelation therapy, which method comprises: (a) measuring the level of soluble urokinase plasminogen activator receptor (suPAR) protein in a sample obtained from a subject at risk of cardiovascular disease; (b) determining that the level of suPAR in the sample is greater than a threshold level (e.g., about 3 ng/mL); and (c) administering a chelation therapy to the subject, thereby treating or preventing cardiovascular disease in the subject. Descriptions of measuring and detecting suPAR, the sample, the subject, cardiovascular disease risk, and components thereof described above also are applicable to those same aspects of the aforementioned method of preventing cardiovascular disease in a subject.

The term "chelation therapy," as used herein, refers to a method for removing heavy metals, such as mercury or lead, from blood. Practitioners have used ethylene diamine tetraacetic acid (EDTA-based) chelation therapy to treat complications of atherosclerosis in diabetes for decades, but without robust evidence of its efficacy. In 2013, the Trial to Assess Chelation Therapy (TACT) study exhibited clinical benefit of an EDTA-based infusion regimen (40 infusions plus high-dose vitamins) in patients (>50 years of age) who had a prior myocardial infarction (MI) (Escolar et al., *Circ Cardiovasc Qual Outcomes*, 7: 15-24 (2014)). The chelation therapy may be performed using routine methods known in the art, and may comprise administering ethylenediaminetetraacetic acid (EDTA), dimercaptosuccinic acid, or dimercaprol to the subject.

In some embodiments, the disclosure provides a method of treating congestive heart failure in a subject with concomitant kidney dysfunction, which method comprises: (a) determining the level of soluble urokinase plasminogen activator receptor (suPAR) protein in a sample obtained from a subject suffering from congestive heart failure with concomitant kidney dysfunction; (b) performing dual organ transplantation of the heart and kidney or mechanical circulatory support on the subject if the level of suPAR in the sample is greater than a threshold level (e.g., about 5 ng/mL); or (c) performing single organ heart transplantation on the subject if the level of suPAR in the sample is less than the threshold level (e.g., about 5 ng/mL), whereby the congestive heart failure in the subject is treated. Descriptions of measuring and detecting suPAR, the sample, the subject, and components thereof described above also are applicable to those same aspects of the aforementioned method of treating congestive heart failure in a subject with concomitant kidney dysfunction.

It is well known in the art that congestive heart failure (HF) (also commonly referred to as "heart failure") is a leading cause of morbidity and mortality in patients with chronic kidney disease (CKD). The accurate diagnosis and effective treatment of HF is challenging in patients with CKD due in part to a lack of validated imaging and biomarkers specifically in this population. The disclosed methods provide a solution to this problem in that suPAR protein levels in heart failure patients with concomitant kidney dysfunction indicate disease severity and can be used to guide treatment decisions. In some embodiments, for example, the method involves performing dual organ transplantation of the heart and kidney or mechanical circulatory support on the subject if the level of suPAR in the sample is greater than a threshold level (e.g., about 5 ng/mL) or performing single organ heart transplantation on the subject if the level of suPAR in the sample is less than the threshold level (e.g., about 5 ng/mL).

The terms "heart transplant" and "cardiac transplant" are synonymous and refer to a surgical transplant procedure performed on patients with end-stage heart failure or severe coronary artery disease when other medical or surgical treatments have failed. Heart transplants are most commonly performed by obtaining a functioning heart, with or without one or both lungs, from a recently deceased organ donor (brain death is the standard) and implanting the heart and one or both lungs into the patient. The recipient's own heart is either removed and replaced with the donor heart (i.e., an "orthotopic" transplant procedure) or, much less commonly, the recipient's diseased heart is left in place to support the donor heart (i.e., a "heterotopic" or "piggyback" transplant procedure). Approximately 3,500 heart transplants are performed every year in the world, more than half of which occur in the United States. The term "kidney transplant," as used herein, refers to a surgical transplant procedure performed on patients with end-stage renal disease in which a healthy kidney from a live or deceased donor is placed into the diseased patient. More than 20,000 kidney transplants are performed annually in the U.S.

The terms "mechanical circulatory support" or "mechanical circulatory support (MCS) device" are used interchangeably herein and refer to a device that either supplements or replaces the action of the failing heart or lungs. In certain embodiments, an MCS device is provided to heart failure patients who experience refractory cardiogenic shock, which is defined as cardiac and circulatory failure resulting in organ hypoperfusion. A variety of MCS devices are known in the art and can be used in connection with the disclosed methods (see, e.g., G. C. Stewart and M. M. Givertz, *Circulation*, 125: 1304-1315 (2012); Ryan et al., *Korean Circ J.*, 49(3): 197-213 (2019); and Miller et al., *Crit Care Med.*, 45(11): 1922-1929 (2017)). Suitable MCS devices include, for example, left or right ventricular assist devices (e.g., THORATEC® pVAD, BVS5000, AB5000, CENTRIMAG™, TANDEMHEART®, or IMPELLA®), an intra-aortic balloon pump (IABP), extra-corporeal membrane oxygenation (ECMO), and a total artificial heart (e.g., Abiomed TAH, CardioWest TAH).

The disclosure also provides a method of treating kidney dysfunction in a subject in need thereof, which method comprises: (a) measuring the level of soluble urokinase plasminogen activator receptor (suPAR) protein in a sample obtained from a subject suffering from kidney dysfunction; (b) determining that the level of suPAR in the sample is greater than a threshold level; and (c) administering a treatment for kidney dysfunction to the subject, whereby the kidney dysfunction is treated in the subject. Descriptions of measuring and detecting suPAR, the sample, the subject, and components thereof described above also are applicable to those same aspects of the aforementioned method of treating kidney dysfunction in a subject. The method may be used to treat any condition causing kidney dysfunction, including, for example, acute kidney injury. Acute kidney injury occurs in 2 to 5% of hospitalized adults and has a major effect on morbidity and health care utilization (Bellomo et al., *Lancet*, 380: 756-66 (2012); Rewa O, Bagshaw S M, *Nat Rev Nephrol*, 10: 193-207 (2014); Lameire et al., *Lancet*, 382: 170-9 (2013); and Pakula A M, Skinner R A., *J Intensive Care Med*, 31: 319-24 (2016)). The largest burden of acute kidney injury occurs in critically ill patients and in persons with cardiovascular disease, who are at increased risk for both acute kidney injury and chronic kidney disease owing to their older age and multiple coexisting conditions, as well as their greater likelihood of undergoing procedures that may directly affect the kidneys, such coronary angiography or cardiac surgery (Pakula and Skinner, supra; McCullough et al., J Am Coll Cardiol; 68: 1465-73 (2016); and Wang Y, Bellomo R., Nat Rev Nephrol; 13: 697-711 (2017)).

Inflammation and oxidative stress are central components of the pathogenesis of acute kidney injury, implicating multiple subtypes of immune cells (Tran et al., Nature 2016; 531: 528-32; and Rabb et al., J Am Soc Nephrol 2016; 27: 371-9). Evidence of a pathway linking the bone marrow to kidney injury has emerged, involving suPAR (Hayek et al., *Nat Med*, 23: 945-53 (2017); and Hayek et al., *N. Engl. J. Med.*, 382: 416-26 (2020); doi: 10.1056/NEJMoa1911481). Levels of suPAR are strongly predictive of progressive decline in kidney function (Hahm et al., *Nat Med.*, 23: 100-6 (2017); Hayek et al., *Kidney Int Rep*, 2: 425-32 (2017), Luo et al., *Clin J Am Soc Nephrol.*, 13: 1013-21 (2018); Schaefer et al., *JAMA Pediatr,* 171(11): e172914 (2017); Schulz et al., *Kidney Int Rep,* 2: 239-47 (2017); and Hayek et al., *J Am Soc Nephrol,* 30: 1305-13 (2019)). Long-term exposure to elevated suPAR levels directly affects the kidneys by means of pathologic activation of αvβ3 integrin expressed in podocytes, resulting in proteinuria (Hayek et al., *Nat Med,* 23: 945-53 (2017); and Hayek et al., *N. Engl. J. Med.,* 382: 416-26 (2020); doi: 10.1056/NEJMoa1911481).

The kidney dysfunction treated by the disclosed method may also be chronic kidney disease (CKD). Chronic kidney disease affects close to 50 million people in the United States alone, with a growing disease burden over the past 15 years and 58% increase in attributable deaths since 2002 (Webster et al., *Lancet,* 389(10075): 1238-52 (2017); Bowe et al., *JAMA Netw Open,* 1(7): e184412 (2018); and Saran et al., *Am J Kidney Dis.;* 73(3S1): A7-A8 (2019)). People with CKD are disproportionately affected by cardiovascular disease (CVD), with two-thirds of patients having at least one form of CVD; atherosclerosis being the most common (Saran et al., supra; Gansevoort et al., *Lancet,* 382(9889): 339-52 (2013); and Benjamin et al., *Circulation,* 137(12): e67-e492 (2018)). Moreover, death from CVD is far more likely than progression to end-stage renal disease in this patient population (Saran et al., supra; Gansevoort et al., supra; and Benjamin et al., supra). Conversely, over 40% of patients with CVD have signs of kidney disease (Saran et al., supra).

Recent work has elucidated mechanisms underlying the association between suPAR and CKD (see, e.g., Wei et al., Nat Med. 2008; 14(1):55-63; Hahm et al., Nat Med. 2017; 23(1):100-6.; Hayek et al., Nat Med. 2017; 23(8):945-53; Wei et al., J Clin Invest. 2019; 129(5):1946-59; and Wei et al., Nat Med. 2011; 17(8):952-60). SuPAR is released by Gr-1$^{lo}$ immature myeloid cells in response to pro-inflammatory stimuli to the bone marrow, and circulates to the kidneys where it binds to αvβ3 integrin expressed by podocytes (Wei et al., Nat Med. 2008; 14(1):55-63, Hahm et al., Nat Med. 2017; 23(1):100-6, and Wei et al., J Clin Invest. 2019; 129(5):1946-59). Pathologic integrin activation by suPAR induces podocyte cytoskeletal restructuring, autophagy, and effacement leading to proteinuria and chronic kidney dysfunction (Wei et al., Nat Med. 2008; 14(1):55-63, Hahm et al., Nat Med. 2017; 23(1):100-6, Wei et al., J Clin Invest. 2019; 129(5):1946-59, and Wei et al. Nat Med. 2011; 17(8):952-60). This mechanism acts in synergy with other risk factors for CKD, such as the presence of APOL1 mutations (Hayek et al., Nat Med. 2017; 23(8):945-53). Furthermore, interfering with the suPAR pathway, by bone marrow ablation, monoclonal antibody, (15) or small molecule inhibitors, can prevent and reverse kidney injury (Wei et al., Nat Med. 2008; 14(1):55-63, Hahm et al., Nat Med. 2017; 23(1):100-6; and Dal Monte et al., J Cell Mol Med. 2019; 23(2):1034-49).

Any number or variety of treatment regimens for kidney dysfunction can be used. Examples of suitable treatment regimens or therapeutics include, for example, statins (described above) diuretics, angiotensin receptor blockers (ARBs), angiotensin converting enzyme (ACE) inhibitors, calcium channel blockers, beta blockers, an anti-suPAR therapy (described above), a kidney transplant, dialysis, or a combination of any of the foregoing.

The disclosure also provides a method of treating heart failure with preserved ejection fraction (HFpEF) in a subject in need thereof, which method comprises: (a) measuring the level of soluble urokinase plasminogen activator receptor (suPAR) protein in a sample obtained from a subject suffering from HFpEF; (b) determining that the level of suPAR in the sample is greater than a threshold level; and (c) administering a HFpEF treatment to the subject, whereby HFpEF is treated in the subject. Descriptions of measuring and detecting suPAR, the sample, the subject, and components thereof described above also are applicable to those same aspects of the aforementioned method of treating HFpEF in a subject.

The burden of heart failure with preserved ejection fraction (HFpEF) continues to grow, and is expected to outpace heart failure with reduced ejection fraction (HFrEF) in prevalence (Benjamin et al., Circulation. 2019; 139(10):e56-e5281, Savarese et al., Card Fail Rev. 2017; 3(1):7-11) Most importantly, HFpEF has posed a major clinical challenge for cardiovascular specialists, as the disease is associated with high morbidity and mortality, but does not respond to conventional therapies with proven efficacy in HFrEF. (Yusuf et al., Lancet. 2003; 362(9386):777-81; Cleland et al., Eur Heart J. 2006; 27(19):2338-45; Massie et al., N Engl J Med. 2008; 359(23):2456-67; Pitt et al., N Engl J Med. 2014; 370(15):1383-92; Solomon et al., N Engl J Med. 2019; Martin et al., Cochrane Database Syst Rev. 2018; 6:CD012721; and Redfield et al., N Engl J Med. 2015; 373(24):2314-24). Various studies have however suggested mineralocorticoid receptor antagonists (MRA) such as spironolactone as a promising therapy for HFpEF (Martin et al., supra; Edelmann et al., JAMA. 2013; 309(8):781-91, and Mottram et al., Circulation. 2004; 110(5):558-65). MRAs have been of particular interest in the management of HFpEF due to their effects on inflammation, interstitial fibrosis, myocardial stiffness, extracellular matrix expansion and vascular function, which are all key components in the pathogenesis of HFpEF (Jia et al., Biochim Biophys Acta Mol Basis Dis. 2017; 1863(8):2012-8; Briet et al., J Vasc Res. 2013; 50(2):89-99; Elinoff et al., Cardiovasc Res. 2018; 114(1):65-76; and Miura et al., J Pharmacol Sci. 2006; 101(3):256-9)

Challenges in the management of HFpEF were highlighted by the Treatment of Preserved Cardiac Function Heart Failure with an Aldosterone Antagonist (TOPCAT) trial, assessing whether spironolactone would improve outcomes in HFpEF. The trial was unfortunately inconclusive (Pitt et al., supra). While spironolactone therapy did not decrease the incidence of the primary outcome in the overall study, a dramatic regional variation in the event rate was noted, with higher event rates in the North American cohort (29.5%) compared to Russia and the Republic of Georgia (8.9%) (Pfeffer et al., Circulation. 2015; 131(1):34-42). Post-hoc analyses showed that North American patients on spironolactone had a lower incidence of cardiovascular events compared to the placebo group (Pfeffer et al., supra). The difference was attributed to the inadequate selection of patients and lack of compliance with spironolactone. Overall, TOPCAT and other HFpEF trials have highlighted HFpEF as a heterogeneous disease with various comorbidities such as metabolic risk, arterial hypertension, and renal insufficiency that drive left ventricular remodeling and dysfunction through systemic inflammation and coronary microvascular endothelial dysfunction (Shah et al., Circulation. 2016; 134(1):73-90; and Paulus W J, Tschope C. J Am Coll Cardiol. 2013; 62(4):263-71). Blood-based biomarkers have been proposed as a method to accurately characterize HFpEF phenotypes and identify patients that would benefit from specific therapies (Shah et al., supra; Paulus and Tschope, supra; and Myhre et al., Circ Heart Fail. 2018; 11(11):e005312). As discussed herein, suPAR plays a known pathogenic role in kidney disease, which is a common co-morbid condition in patients with HFpEF.

Experiments described in detail below show that outcomes in HFpEF are tightly linked to suPAR levels.

Upon diagnosis of HFpEF, the subject may be administered any suitable HFpEF treatment. Treatment of HFpEF is largely governed by management of associated conditions and symptoms. Any number or variety of treatment regimens can be used, including any treatment that reduces the risk of developing HFpEF. Risk for developing HFpEF is reduced when systolic and diastolic blood pressure is less than about 140/90 mm Hg, or less than about 130/80 mm Hg if the subject has diabetes or renal disease. Examples of suitable treatment regimens or therapeutics include, for example, mineralocorticoid receptor antagonists and diuretics (to treat volume overload). If diuretics are chosen, it will be appreciated that volume depletion should be avoided. Angiotensin receptor blockers (ARBs), angiotensin converting enzyme (ACE) inhibitors, calcium channel blockers, and beta blockers can be used to treat hypertension but may not alter clinical outcomes in HFpEF. In patients with diabetes mellitus who are at risk for heart failure, diuretic-based antihypertensive therapy, ACE inhibitors, beta-blockers, glycemic control, and/or an anti-suPAR therapy (described above) can be employed to prevent heart failure. Clinicians also can encourage lifestyle changes in patients at risk of developing HFpEF, such as, for example, weight loss, smoking cessation, regular exercise, and a healthy diet.

In some embodiments, the disclosure also provides a method to direct the post-hospital discharge care of patients admitted with, treated for, or at high risk of cardiovascular disease, which method comprises: (a) measuring the level of soluble urokinase plasminogen activator receptor (suPAR) protein in a sample obtained prior to discharge; (b) setting up a post-discharge follow-up in clinic within two weeks, telehealth monitoring or home care if the suPAR level in the sample is greater than a threshold level (e.g., about 3 ng/mL for men, and about 4 ng/mL for women) or (c) arranging for routine follow-up post-discharge for suPAR levels below the threshold. In some embodiments, telehealth monitoring is a cardiac event monitor, digital sensors, automated blood pressure monitoring, or an impedance monitor.

In some embodiments, the disclosure provides methods of diagnosing a disease or condition that is associated with an increase in suPAR levels. In this regard, for example, the disclosure provides diagnosing a subject as suffering from such a disease or condition, which comprises (a) determining the level of soluble urokinase plasminogen activator receptor (suPAR) protein in a sample obtained from a subject suspected of suffering from the disease or condition, (b) comparing the amount of suPAR in the subject to a threshold level of suPAR if the level of suPAR in the sample is greater than a threshold level; and (c) detecting a level of suPAR in the subject that is greater than the threshold level; and (d) diagnosing the subject as suffering from the disease or condition. Descriptions of measuring and detecting suPAR, the sample, the subject, and components thereof described above also are applicable to those same aspects of the aforementioned method of diagnosing a disease or condition in a subject. The disease or condition may be any disease or condition described herein, including, but not limited to, cardiovascular disease (CVD), kidney dysfunction (e.g., chronic kidney disease (CKD) or acute kidney injury), congestive heart failure, and heart failure with preserved ejection fraction (HFpEF). Other diseases or conditions associated with increased levels of suPAR may be diagnosed in accordance with the methods described herein.

The following examples further illustrate the invention but, of course, should not be construed as in any way limiting its scope.

Example 1

This example demonstrates that suPAR is a strong biomarker of CVD risk and is associated with atherosclerosis.

Figure 1B:
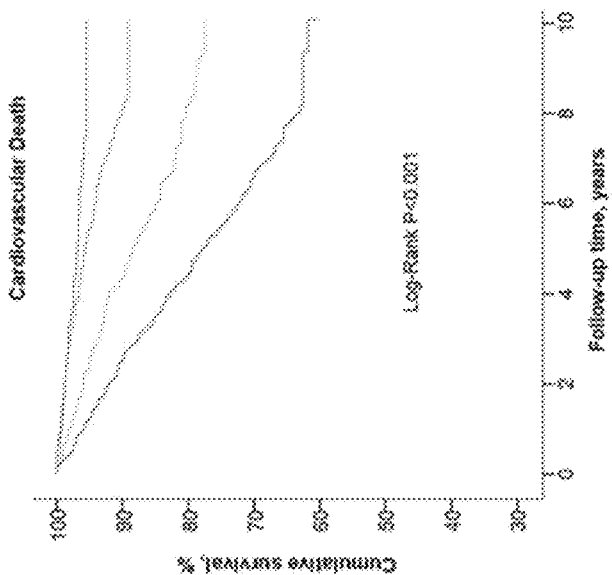
Figure 1A:
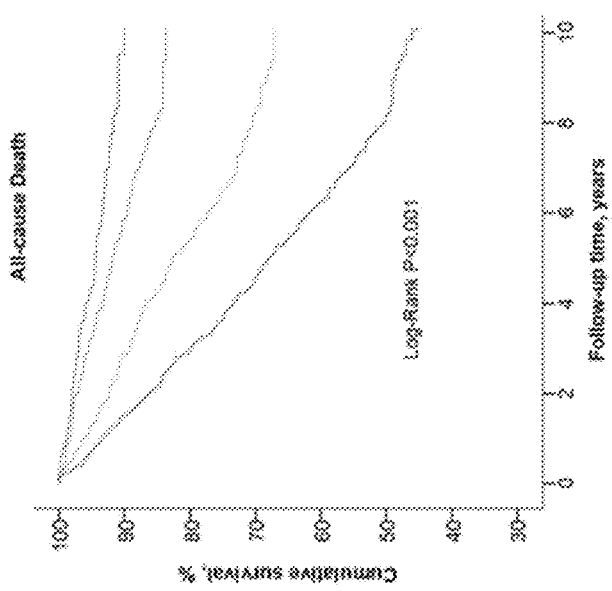

Levels of suPAR have been associated with incident CVD and poor outcomes in various patient groups, including critically ill patients, those with HIV, cancer, kidney disease, as well as the general population (see, e.g., Eapen et al., J Am Heart Assoc. 2014; 3(5):e001118, Edsfeldt et al., Stroke. 2012; 43(12):3305-12, 48-56; and Botha et al., Int J Cardiol. 2015; 184:631-6). The association is independent of its impact on the kidneys, as even patients with end-stage renal disease can be risk-stratified using suPAR (Drechsler et al., Clinical journal of the American Society of Nephrology: CJASN. 2017; 12(8):1265-73). Preliminary data from the Emory Cardiovascular Biobank (Ko et al., BMJ Open, 2017; 7: e018753) shows that suPAR is a strong predictor of risk, with patients in the 4th suPAR quartile (>3900 pg/ml) having a 5-year mortality close to 40% (FIG. 1). SuPAR outperformed hs-CRP, high sensitivity troponin I (hsTnI) and B-type natriuretic peptide (BNP) in predicting outcomes of 4,613 patients undergoing coronary angiography for suspected CVD, as shown in Table 1.

TABLE 1

SuPAR Compared to hs-TnI, hs-CRP and BNP in Predicting CV Death. All models are adjusted for age, gender, race, BMI, smoking, hypertension, diabetes, eGFR, obstructure coronary artery disease history

| Model | Cardiovascular Death | |
|---|---|---|
| | C-statistic (95% CI) | ΔC-statistic (95% CI) |
| Model 1: Risk factors only | 0.663 (0.621, 0.704) | — |
| Model 2: RF and suPAR | 0.721 (0.679, 0.763) | 0.058 (0.027, 0.090) |
| Model 3: RF and hs-TnI | 0.676 (0.632, 0.721) | 0.014 (−0.001, 0.029) |
| Model 4: RF and hs-CRP | 0.682 (0.633, 0.731) | 0.016 (−0.006, 0.038) |
| Model 5: RF and BNP | 0.705 (0.679-0.730) | 0.023 (0.006-0.039) |

Figure 2:
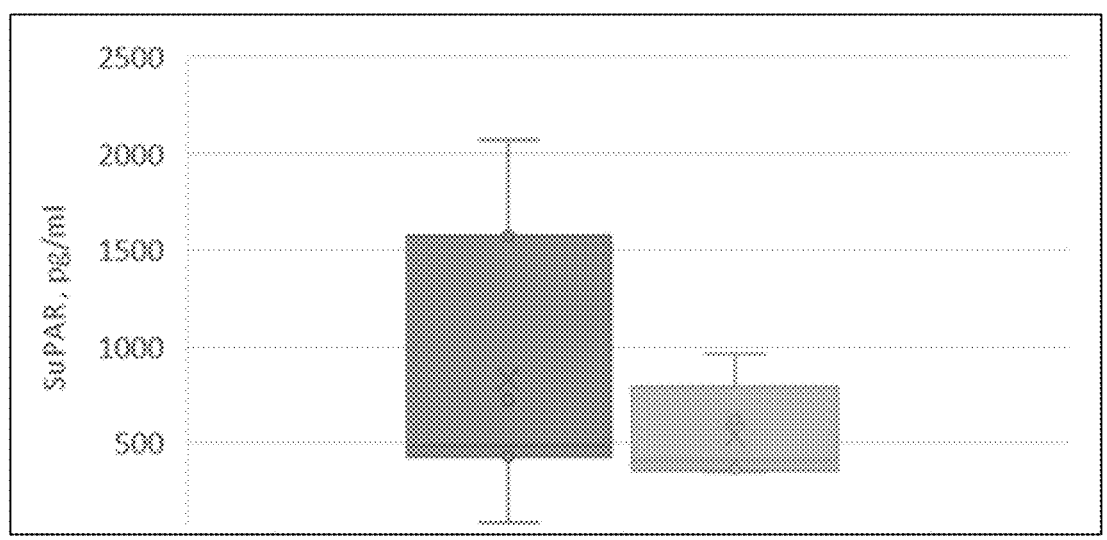
FIG. 2 is a graph showing suPAR levels 12 weeks after transfection of C57B6 mice at 20 weeks with PCSK9 (n=8) or saline (n=8). There was no difference in suPAR levels between groups, despite extensive atherosclerotic disease in PCSK9-transfected mice.

In other preliminary experimental work, suPAR levels were measured in a mouse model of atherosclerosis induced by injecting a gain-of-function adeno-associated viral (AAV) vector encoding the atherogenic D377Y mutation of the PCSK9 gene (Maxwell et al., Proc Natl Acad Sci USA. 2005; 102(6):2069-74). Expression of D377Y-PCSK9 led to dramatic increases in LDL by accelerating the degradation of the LDL receptor. This model was chosen to minimize off-target effects and the immunologic impact of the commonly used apoE or LDLr knockout mouse models (Oppi et al., Front Cardiovasc Med. 2019; 6:46). It was found that suPAR levels were not increased in mice with induced atherosclerosis compared to controls (FIG. 2), suggesting that high suPAR levels are unlikely to be simply a consequence of atherosclerotic disease.

Example 3

This example describes experiments to investigate if suPAR is a precursor of CVD.

While suPAR levels are predictive of outcomes in various clinical settings, the mechanisms underlying this association are unclear (see, e.g., Eapen et al., supra, Edsfeldt et al., supra, and Arbel et al., Can J Cardiol. 2015; 31(10):1223-4.)

Characterizing the relationship between suPAR and subclinical markers of CVD can offer valuable insights into implicated pathways. Several studies have found differential associations between suPAR and various indices of subclinical CVD. It has been reported in cross-sectional studies that coronary calcifications correlated with suPAR but not hs-CRP (Hayek et al., J Am Heart Assoc. 2018; 7(9); and Sorensen et al., Atherosclerosis. 2014; 237(1):60-6). Similarly, patients with high suPAR were more likely to have evidence of carotid plaques (Edsfeldt et al., supra; and Persson et al., Stroke. 2014; 45(1):18-23). Findings regarding suPAR's association with arterial stiffness as assessed by pulse-wave velocity were conflicting (Sehestedt et al., Atherosclerosis. 2011; 216(1):237-43; and Schutte et al., Thromb Res. 2012; 130(2):273-7). Overall, these studies suggest suPAR levels preferentially relate to atherosclerosis, however they are limited by the lack of longitudinal analyses, minimal ethnic diversity, and inadequate adjustment for potential confounders, notably kidney function.

The Multi-Ethnic Study of Atherosclerosis (MESA) will be leveraged to provide clarity on the link between suPAR and subclinical markers of CVD, cross-sectionally, longitudinally, and in their association with outcomes. MESA is an NIH-funded prospective cohort initiated in July 2000 to investigate the prevalence, correlates, and progression of subclinical CVD in a population-based sample of 6,781 men (48%) and women (52%) aged 45-84 years, recruited from six field centers across the US. Approximately 38% of the cohort is White, 28% African American, 23% Hispanic, and 11% Asian. Individuals with known clinical CVD were excluded. Baseline measurements are listed in Table 2. Measurements of subclinical disease indicators and risk factors was repeated for the study of progression over 10 years. Participants were also followed for identification and characterization of CVD events, including acute myocardial infarction and other coronary heart disease, stroke, peripheral vascular disease, and congestive heart failure; therapeutic interventions for CVD; and mortality. Studies from MESA have provided key findings that have altered the practice of CV medicine such as the identification of CAC as a predictor of events and its clinical usefulness (Polonsky et al., JAMA. 2010; 303(16):1610-6; Detrano et al., N Engl J Med. 2008; 358(13):1336-45), and is the ideal cohort to characterize suPAR's role in the development of CVD in a multiethnic sample of the general population. suPAR will be measured in 5,784 samples from the MESA study.

TABLE 2

MESA Measurements at Exam 1

Questionnaires

Food Frequency (Diet)
Medical Hx
Medications
Occupation/employment
Personal Hx
Physical Activity
Psycho-Social
Procedures/Assessments Ankle Brachial Index (ABI)
Anthropometry
Arterial Wave Form/Arterial Stiffness
Blood Pressure
Blood Sample collection
CT Coronary (Chest)
Electrocardiogram (ECG)
Genotyping TABLE 2-continued MESA Measurements at Exam 1

MRI Cardiac
Urine collection
US Carotid Distensibility
US Carotid IMT
US Plaque
US Endothelial Function (FMD)

Measuring suPAR: Plasma levels of suPAR will be measured using the Virogates ELISA kit (suPARnostic kit; Copenhagen, Denmark), which has a lower detection limit of 100 pg/mL and intra- and inter-assay variation of 2.75% and 9.17%, respectively, as determined by the assay manufacturer. Serum suPAR levels have shown stability extending up to 5 years in storage, and with repeated freeze-thaw. (82) All major publications on suPAR have used the suPARnostic assay (see, e.g., Diederichsen et al., Atherosclerosis. 2018; 271:245-51, Andersen et al., J Med Virol. 2008; 80(2):209-16, Botha et al., supra, and Sorensen et al., supra).

Preliminary Results: The predictive ability of suPAR has been compared to hs-CRP, hs-TnI and BNP in 4,613 patients undergoing coronary angiography for suspected CVD and enrolled in the Emory Cardiovascular Biobank (Ko et al., supra), and suPAR has been found to be strongly predictive of outcomes (FIG. 1) and dramatically outperforms these markers in their ability to discriminate risk (Table 1). In a smaller cohort of 500 African Americans with type 2 diabetes mellitus, suPAR has outperformed coronary artery calcium (CAC) score and hs-CRP in predicting all-cause death (Hayek et al., J Am Heart Assoc. 2018; 7(9)). SuPAR's correlation with CAC was modest ($r=0.18$, $P<0.001$), and remained significant after adjusting for relevant clinical characteristics including kidney function. The study was limited in the absence of longitudinal evaluation of CAC, and the select population (African Americans with diabetes mellitus). Also examined was the association between suPAR levels and carotid intima thickness, indices of vascular stiffness (augmentation index, pulse wave velocity), and endothelial function (brachial artery flow-mediated dilation) in 450 overall healthy participants (35% male, 22% African American, mean age of 50 years) of the Emory Predictive Health Project, a cohort of Emory University and Georgia Tech employees that volunteered for health screening. suPAR levels correlated with carotid intima media thickness ($r=0.16$, $P<0.001$), augmentation index ($r=0.19$, $P<0.001$), pulse wave velocity ($r=0.10$, $P=0.046$), but not flow-mediated dilation ($r=-0.09$, $P=0.051$). This subgroup had a <10% prevalence of CV risk factors (hypertension, diabetes mellitus, and smoking), and suPAR levels were overall low (median suPAR of 2313 pg/ml, compared to 2950 pg/ml in the Emory Cardiovascular Biobank). While informative, the cross-sectional nature of these studies and their select population precludes determining whether high suPAR is associated with progression of subclinical disease.

To quantify the relationship between suPAR levels and subclinical markers of CVD in MESA (n=5,784), the relationship between suPAR levels and CAC will first be examined in cross-sectional analyses as a primary outcome measure, and carotid intima-media thickness, augmentation index, pulse-wave velocity and flow-mediated dilation as secondary outcomes. SuPAR and CAC levels typically follow a non-normal distribution (right-skewed), and will be log-transformed for the purposes of parametric analyses. Kidney function will be estimated using creatinine-derived estimated glomerular filtration rate (eGFR) calculated using the CKD-EPI equation (Levey et al., Ann Intern Med. 2009; 150(9):604-12). In univariate analysis suPAR will be correlated with the aforementioned measures using Pearson's correlation. Multiple linear regressions will be used to model suPAR as a function of CAC adjusting for age, gender, ethnicity, creatinine, smoking status, hypertension, LDL, HDL and diabetes mellitus to determine whether suPAR levels and the various subclinical markers of atherosclerosis are independently associated. In power analyses, a sample size of 5,784 will achieve 87% power to show that the expected Pearson's Correlation coefficient between suPAR and CAC of 0.18 is significantly higher than the null hypothesis correlation of 0.14, using a two-sided hypothesis test with a significance level of 0.05.

Next, longitudinal analyses will be performed to determine whether baseline suPAR is associated with progression of CAC. Table 3 shows the number of participants with CAC measures at each exam.

TABLE 3

|  | Valid N | Mean | Median | Standard Deviation | Variance | Range |
|---|---|---|---|---|---|---|
| Exam 1 CAC | 5784 | 152 | 1 | 424 | 179597 | 6316 |
| Exam 2 CAC - 2 years | 2511 | 175 | 5 | 459 | 210777 | 5193 |
| Exam 3 CAC - 4 years | 2353 | 228 | 13 | 546 | 298154 | 5420 |
| Exam 4 CAC - 6 years | 987 | 282 | 26 | 623 | 388300 | 5814 |
| Exam 5 CAC - 10 years | 2691 | 302 | 48 | 615 | 378051 | 6389 |

Overall, 89% of participants had at least 2 CAC measures, and 50% had at least 3. Linear mixed modeling will be used by regressing CAC on suPAR, follow-up time (years since baseline CAC measure), suPAR×time, in addition to the aforementioned covariates including baseline CAC. The model will include a random subject-specific intercept and a random time effect to account for natural heterogeneity across subjects. Normalizing transformations (e.g., log) will be used if necessary to ensure accurate model fit. The interaction between suPAR and time in the model will be tested to show whether the progression pattern of CAC depends on suPAR. Three-way interaction terms will be incorporated into the model to determine whether gender, ethnicity, and decline in kidney function modify the association between suPAR and change in CAC. CAC missing data distributions will be checked, and if necessary, multiple imputation procedures and double robust analysis in data analysis will be considered. These associations will be examined in the subgroup of participants with CAC of 0 at baseline. In power analyses, a difference in the rate of change in CAC over time (i.e., the slope in the linear model assuming a constant rate) between low and high suPAR groups dichotomized by median is expected. A sample size of 5,784 will provide 86% power to detect a difference of 0.08 in slope or larger, assuming the standard deviation of the slopes in each group is 1, using a two-sided two-sample t test with equal variances at a significance level of 0.05. The actual power will likely be higher in the context of the linear mixed effects model due to efficiency gains from modeling repeated data and accounting for both within-group and between-group correlations.

To determine whether suPAR's association with outcomes is dependent on progression of CAC and decline in kidney function, survival analyses will be performed to determine whether suPAR levels are associated with a-prior defined outcomes in MESA (Table 4).

TABLE 4

Events in MESA

| MI | | 324 |
|---|---|---|
| Angina | | 347 |
| CHF | | 358 |
| PVD | | 118 |
| Resuscitated Cardiac Arrest | | 38 |
| PTCA | | 294 |
| CABG | | 158 |
| Other Revascularization | | 81 |
| Stroke | | 304 |
| TIA | | 99 |
| Death | CVD | 184 |
|  | Stroke | 57 |
|  | Other Athero | 17 |
|  | Other CVD | 102 |
|  | Non-CVD | 173 |
|  | Unknown | 6 |
|  | Non-Cardiovascular (Ineligible Death) | 855 |
| Composite Endpoints | Hard CHD | 470 |
|  | All CHD | 668 |
|  | Hard CVD | 732 |
|  | All CVD | 1007 |
|  | Coronary Revascularization | 412 |

The primary outcome will be all-cause mortality (n=1248), and the secondary outcome will be incident coronary heart disease (CHD) (n=889), a composite endpoint of myocardial infarction, angina, resuscitated cardiac arrest and death from coronary disease. Average follow-up time was 13 years. In univariate analysis outcomes across suPAR quartiles will be compared using the log-rank test and Kaplan-Meier survival curves will be generated. Furthermore, Cox proportional hazards regression will be used to study the effect of suPAR (groups or continuous value), after adjusting for age, gender, ethnicity, eGFR, smoking status, hypertension, LDL, HDL and diabetes mellitus. The assumptions of proportional hazard and linear form of covariates (log or not) will be assessed by martingale residuals plots and the Kolmogorov-type supremum test. Various interactions will be tested to explore whether the association between suPAR and the survival outcome differs in subgroups defined by relevant variables, such as gender, age, ethnicity, diabetes mellitus, and baseline eGFR. Lastly, mediation analysis will be performed to quantify the direct contributions of suPAR to outcomes compared to CAC and decline in eGFR, using a single mediator model for CAC and eGFR separately as previously described (MacKinnon et al., J Public Health Dent. 2011; 71 Suppl 1:S37-46).

In power analyses based on preliminary data, the following conservative assumptions were used: a dichotomized suPAR using the median as a cutoff, and a conservative estimate of survival (FIG. 1) at 5 years of 0.95 in the low suPAR group and 0.75 in high suPAR group, a study duration of 10 years, with subject accrual in the first 5 years, and an estimated drop-out rate of 10%. With 5784 participants (2892 in each group), there is >95% power to detect a difference in survival rate between 0.95 in the low suPAR group and 0.75 in the low suPAR group (a conservative estimate), using a log-rank test at significant level of 0.05. Thus, this model is adequately powered to perform multivariable analyses, test interactions and subgroup analyses.

To compare suPAR's ability to discriminate risk compared to CAC and hs-CRP, Harrel's C-statistic, the integrated discrimination index (IDI), and net reclassification index (NRI) will be used to compare the ability of suPAR to discriminate risk of death and incident CHD as previously defined to that of CAC and hs-CRP. The baseline model will consist of the Atherosclerotic Cardiovascular Disease (AS-CVD) risk score established in the latest guidelines of the American College of Cardiology and American Heart Association, and an important tool in clinical practice (Grundy et al., J Am Coll Cardiol. 2019; 73(24):e285-e350). The change in C-statistic, IDI, and NRI will be computed after addition of hs-CRP, CAC, and suPAR. These indices will be computed for the overall cohort, in addition to the low-risk group (n=2378, 41%) as defined by an ASCVD risk score of <7.5%. In power analyses, based on preliminary data (Table 1, C-statistic of 0.663 for the risk factor model, and 0.721 with suPAR added) and the death rate of 10% at 8 years in MESA, there will 86% power to detect this hypothesized difference in the c-index, assuming years 90% of subjects have ≥8 years follow-up or died in the study period, using a two-sided z-test at a significance level of 0.05.

Expected Results: Based on preliminary findings suPAR levels are expected to modestly correlate with CAC, but most importantly suPAR is expected to be a strong predictor of CAC progression and events, independently of clinical characteristics, ASCVD risk score, and kidney function.

While CAC represents a surrogate measure of atherosclerosis, not all plaque is calcified. Thus, the absence of a relationship between suPAR and progression of CAC will decrease the likelihood of suPAR being involved in the pathogenesis of CVD, but does not exclude it. To increase the sensitivity of these analyses, examining the association between suPAR and overall vascular calcifications will be considered; including evidence of atherosclerosis in other vascular beds, such as the carotids and aorta.

Example 4

This example describes experiments to identify genetic determinants of suPAR levels, and assess potential causality between suPAR and both CKD and CVD using Mendelian randomization (MR).

Establishing causality between biomarkers and disease processes is fraught with challenges, given a multitude of factors can influence the levels of a given marker and confound-correlation causation inferences. Experimental models are costly and imperfect for numerous reasons, the most notable being the extrapolation of findings from animal and in vitro models to human physiology. Causality can however be strongly supported using human populations where associations between biomarkers and their genetic determinants—which have been randomly distributed in a population, and a specified disease outcome using MR (Sekula et al., J Am Soc Nephrol. 2016; 27(11):3253-65). An example of the power of MR in CVD is demonstrated by the studies that confirmed causality for LDL but not HDL in the pathogenesis of coronary artery disease (CAD). MR will test the hypothesis that suPAR is causally involved in CVD and CKD.

If consistent with this hypothesis, adults with genetic predisposition to higher suPAR levels will also be more likely to have been diagnosed with CVD and or CKD. The key resources required for MR are independent populations that are genotyped across the genome and phenotyped for suPAR (GWAS study populations) or phenotyped for CVD and CKD (MR population). MR analyses apply a rigorous statistical approach in the independent population to uncover causality between factor levels and the disease. Genome-wide association of studies of suPAR have not previously been reported. As preliminary data, plasma suPAR was measured and a GWAS was performed in 3,244 young, healthy participants: 2,304 enrolled in the Trinity Student Study (TSS) and 940 in the Genes and Blood-Clotting (GABC) study. The findings will be replicated in a GWAS of MESA, a meta-analysis of all three cohorts will be performed to confirm the robustness of these findings, and then a MR analysis will be performed in 500,000 participants of the UK Biobank.

The Trinity Student Study (TSS) is a cohort of 2,507 healthy and ethnically Irish individuals between 21 and 24 years old (59% female) attending University of Dublin, Trinity College who were recruited over the 2003-2004 academic year to study nutrition and metabolic phenotypes (Mills et al., The American Journal of Clinical Nutrition. 2011; 94(2):495-500). After genotype quality control and plasma assays, 2304 individual samples are available for study. Multiple studies have been performed on the plasma samples from TSS which were accessed with the permission of the TSS leadership. The original genotyping was performed on the Illumina Omni-1 quad with subsequent imputation to >7.2 million SNPs.

The Genes and Blood-Clotting (GABC) study consists of a cohort of 1,189 young adults in 502 independent sibships recruited from the student population at the University of Michigan (NIH R37-HL039693, NIH R01-HL112642), which purpose was to study bleeding and coagulation phenotypes. The age range of GABC was 14-35 years with a median of age of 21. Sixty-three percent of GABC participants are female. This is a multiethnic cohort primarily composed of individuals of European origin (79%). The GABC Study was incorporated into the NIH Genes and Environment Initiative as part of the GENEVA (Gene Environment Association Studies) Consortium (Laurie et al., Nat Genet. 2012; 44(6):642-50; Machiela et al., Am J Hum Genet. 2015; 96(3):487-97, (90, 91)). DNA samples from both the GABC were genotyped using the Illumina HumanOmni1-Quad_v1-0_B array. The description of data cleaning/imputation steps and initial analyses are available at dbGaP (Desch et al., The Genes and Blood Clotting Study—dbGaP entry 2010 [Available from: ncbi.nlm.nih.gov/projects/gap/cgi-bin/study.cgi?study_id=phs000304.v1.p1]).
Recently, genotyped SNPs from GABC and TSS were used to impute additional variants using the University of Michigan's public imputation server which now allows for the analysis of over 10 million SNPs in these cohorts.

The UK Biobank project is a prospective cohort study with deep genetic and phenotypic data collected on approximately 500,000 individuals from across the United Kingdom, aged between 40 and 69 at recruitment (Bycroft et al., Nature. 2018; 562(7726):203-9). It is supported by the National Health Service (NHS). UK Biobank is open to bona fide researchers anywhere in the world, including those funded by academia and industry. Many groups have used this publicly available database to answer important questions about the genomic determinants of complex genetic traits. Genome-wide genotyping using UK BiLEVE Axiom Array by Affymetrix is available on all 488,377 participants. Data from the UK biobanks is accessed through a standard application process and is available to bonafide research groups. All findings are reported back to the UK Biobank at completion and shared with the scientific community.

MESA genetic data contains Affymetrix 6.0 genotypes and Infinium HumanExome BeadChip data, produced as part of NHLBI's SNP Health Association Resource (SHARe) project. SNPs were imputed using IMPUTEv2.2.2 to the 1000 genomes cosmopolitan Phase 1 v3 as a reference (Bycroft et al., supra). More information on MESA is described above.

Preliminary Results: In order to identify common genetic variants contributing to the variation in suPAR levels, and to estimate the heritability of suPAR, plasma suPAR levels were measured in GABC (n=1,152) (Desch et al., Proc Natl Acad Sci USA. 2013; 110(2):588-93, and TSS (n=2,304) (Stone et al., PLoS One. 2011; 6(7):e21851) using the Virogates ELISA kit (suPARnostic kit; Copenhagen, Denmark). These cohorts have a narrow age range (14-35 years) and are generally healthy, minimizing the confounding effects of renal disease, atherosclerosis and medical treatment on plasma suPAR levels. Consistent with previous studies, it was observed that suPAR antigen levels in these cohorts were not normally distributed. Therefore, the antigen level distribution was normalized by log transformation. The associations of smoking with raw suPAR level distribution were analyzed with Kolmogorov-Smirnov tests. The effects of BMI, weight, age, gender and population structure on the suPAR levels were determined by separate single-factor linear regression analysis. Narrow sense heritability (h2) of the suPAR level in the combined GABC and TSS dataset was first estimated by using the known sibship relationships, yielding an intraclass correlation-based upper bound estimate of 64.0%; consistent with the estimates derived from the genome-wide genotyping data for all individuals: 63.6% using MERLIN, and 64.0% using GCTA (Abecasis et al., Nat Genet. 2002; 30(1):97-101; Yang et al., Am J Hum Genet. 2011; 88(1):76-82). Single-SNP quantitative trait association analysis for the adjusted suPAR level were performed in TSS and the European subset of GABC using PLINK (Purcell et al., American Journal of Human Genetics; 2007; 81(3):559-75), and EMMAX (Efficient Mixed-Model Association eXpedited) (Kang et al., Nat Genet. 2010; 42(4):348-54). The genome-wide significance level is set at $P=5\times10^{-8}$ based on Bonferroni correction for 1 million independent tests.

Figure 3:
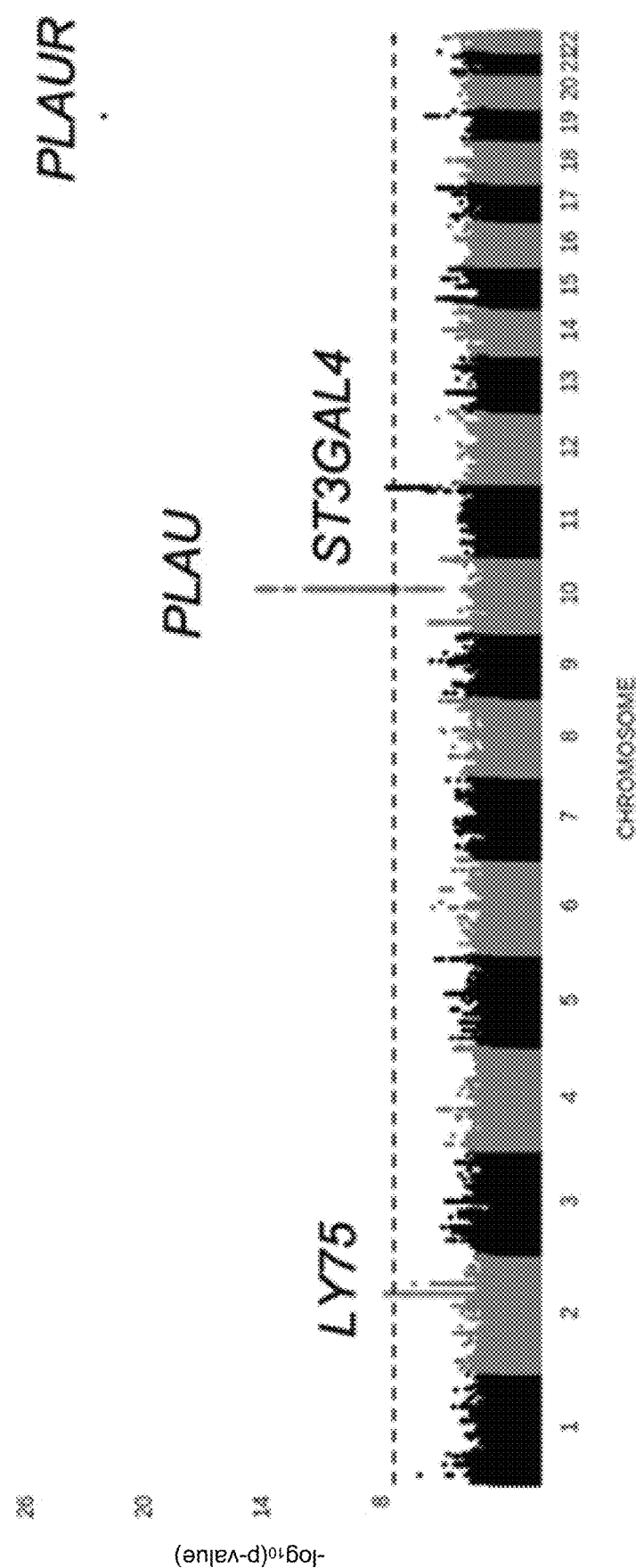
FIG. 3 is a Manhattan plot of results from the GWAS of 3,244 participants. The top signal detected at the PLAUR locus is SNP rs4760 which encodes a nonsynonymous variant. Other significant signals are detected at the PLAU, LY75, and ST3GAL4 loci.

Meta-analysis was carried out using a fixed effect, sample-size-weighted approach implemented in METAL (Willer et al., Bioinformatics. 2010; 26(17):2190-1) using EMMAX association results for TSS and the European subset of GABC from a common set of 741,807 SNPs (FIG. 3). The genomic control factors (Devlin et al., Theoretical Population Biology. 2001; 60(3):155-66) were corrected to 1.00 in meta-analysis by METAL. The results uncovered four independent loci associated with plasma suPAR levels. The strongest signal was in cis with the PLAUR locus encoding uPAR (suPAR). The top SNP rs4760(A), $p=9.95\times10^{-23}$, has a minor allele frequency (MAF) of 16% in the gnomAD European subpopulations database and encodes the PLAUR missense variant L272P. Conditional analysis revealed a second independent locus at PLAUR with the top SNP rs2302524(T), $p=1.17\times10^{-11}$. The second strongest signal was rs2633318(T), MAF 44%, $p=5.84\times10^{-15}$ near the PLAU locus, the gene encoding the suPAR ligand urokinase. rs2633318 has no current ClinVar associations. Two other trans loci had variants with genome-wide significance, rs10183731(G), $p=1.80\times10^{-8}$, MAF 42%, an intronic variant in the LY75 locus and rs11220465(A), $p=2.54\times10^{-8}$, MAF 17%, an intronic variant at the ST3GAL4 locus. The former locus encoding a lymphocyte associated antigen and the latter a sialyltransferase enzyme that alters the sialic acid structures on N and O linked glycans common to many plasma proteins.

In summary, these data demonstrate that suPAR levels are highly heritable in a healthy young population and using GWAS specific variants were identified in genes encoding uPAR, its ligand uPA, a lymphocyte-associated antigen and a sialyltransferase, which are associated with suPAR level variation. These initial findings support the aim of GWAS replication in a larger cohort (MESA) and subsequent MR studies in the UK Biobank.

A GWAS of plasma suPAR in the MESA study will be performed. SuPAR levels across cohorts are typically non-normally distributed, which will be normalized using log transformation. Significant associations with known covariates will be investigated, including the associations of smoking, the effects of BMI, weight, age, gender and population structure. Significant effects will be detected by separate single-factor linear regression analysis. Principal component (PC) scores will be regressed against the age and gender-corrected suPAR antigen levels, and the Pearson's correlation coefficients and p-values will be extracted. Genome-wide association tests will be conducted for all SNPs using an additive model and incorporating each PC score separately as a covariate to evaluate its impact on the genomic control factor (GC). After analyzing the Pearson's correlation coefficients, p-values and GC factors, the principal component(s) will be selected that are highly correlated with the suPAR levels and result in the lowest GC factors.

Single-SNP quantitative trait association analysis for the adjusted suPAR level will be performed in the European ancestry subset of MESA using PLINK (Purcell et al., supra), assuming an additive mode of allelic effect on unrelated samples. Compared to GABC and TSS, it is expected that the analysis of MESA samples will generate different distributions of suPAR levels and will have lower heritability estimates. Narrow sense heritability (h2) of suPAR levels in the sibling subset of the MESA dataset will be estimated by intraclass correlation. Likewise, estimates will also be derived from the genome-wide genotyping data for all individuals using MERLIN, and using GCTA software packages (Abecasis et al., supra; and Yang et al., supra).

A meta-analysis combining GWAS data from TSS/GABC and MESA cohorts will be performed. Specifically, a meta-analysis will be carried out using a fixed effect, sample-size-weighted approach implemented in METAL (Willer et al., supra) using EMMAX association results for TSS and the European subset of GABC from a common set of SNPs. The availability of imputed datasets of all three cohorts should facilitate the use of many shared SNPs. Genomic control factors (Devlin et al., supra) will be corrected to 1.000 in meta-analysis by METAL. Conditional analysis will then be performed on the top signals to determine the number of independent haplotypes at each major locus and to uncover possible interactions between cis and trans association signals.

A Mendelian randomization study will then be performed to connect suPAR levels to risk for CKD and CVD. To this end, top signals from the meta-analysis of suPAR levels in sub-aims 2A and 2B will be candidate instrumental variables (IV) for suPAR. Phenotyping and genotyping data will be obtained from the UK Biobank (application in process). MR-Egger regressions and weighted median estimates (WME) will be performed to diagnose whether the instrumental variables for the main analysis estimates are valid. To avoid bias due to pleiotropic effect of SNPs used in MR, the causal effect estimates produced by each of the individual variants will be examined using scatter plots, funnel plots, and forest plots and calculated heterogeneity statistics. This will allow selection of variants as IV as follows: first, IV will be removed from pleotropic loci which demonstrate known effects with multiple CVD/CKD related traits. Given ST3GAL4 loci SNP associations with other plasma antigens, these SNPs likely will be removed due to pleiotropy.

Through GWAS meta-analysis, confirmation of the association of PLAUR, PLAU, LY75 and ST3GAL4 that were detected in the preliminary analysis in the GABC and TSS cohorts is expected. With the increased power of the additional MESA samples, additional signals should be detected (Table 5).

TABLE 5

Power calculations for GWAS of plasma suPAR levels. Power increases with heritability estimate and sample size. Alpha at 0.05 and individuals unrelated.

| | Sample Size | | |
|---|---|---|---|
| Heritability | 940(GABC) | 3340 (+TSS) | 9340 (+MESA) |
| 0.2 | 0.09 | 0.56 | 1 |
| 0.3 | 0.15 | 0.89 | 1 |
| 0.4 | 0.22 | 0.99 | 1 |
| 0.5 | 0.31 | 0.99 | 1 |
| 0.6 | 0.43 | 1 | 1 |
| 0.64 | 0.48 | 1 | 1 |

In the MR study, confirmation of the causal association of suPAR with CKD and/or CVD is expected. This expectation is based on the strength of the preliminary data in both human and experimental models which has uncovered a pathogenic role for suPAR in kidney disease.

Figure 4:
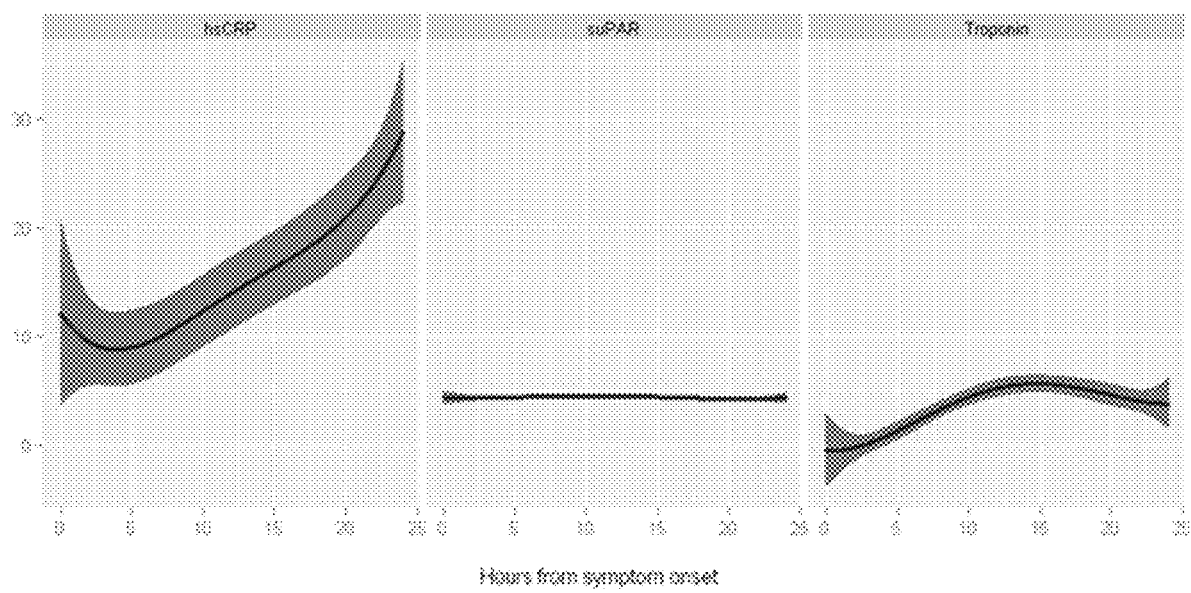
FIG. 4 shows that suPAR levels are stable post-myocardial infarction. High-sensitivity C-reactive (hsCRP), suPAR, and troponin were measured serially in 296 consecutive patients presenting with an ST-elevation myocardial infarction.

Initial analyses in healthy young population estimates a high heritability of 64% and reveals strong associations at 4 gene loci. The addition of the MESA samples should increase power substantially to detect weaker associations. However, the power to detect associations in MESA may be weaker than in the GABC and TSS due to the presence of environmental modifiers of suPAR levels which include diabetes mellitus, smoking and unknown confounders. The loss of power is buffered by the relatively low amount of smoking (13%) and diabetes (12.6%) in MESA, the large number of participants (5,841), and previous work demonstrating the stability of suPAR levels despite environmental influences, such as acute inflammation, myocardial infarction (FIG. 4) or circadian rhythm. The possible decreased power in MESA will be addressed through the stringent correction of significant covariates. Additionally, if necessary, analyses in additional genotyped cohorts will be performed, including investigations of suPAR levels in the Prevention of REnal and Vascular ENd-stage Disease cohort (PREVEND) (Pinto-Sietsma et al., Am Soc Nephrol. 2000; 11(10):1882-8 (Pinto-Sietsma et al., J Am Soc Nephrol. 2000; 11(10):1882-8). For the MR study, a positive result will strongly support the causal role for suPAR in CVD and CKD. Negative results, however, can be more difficult to interpret as they are reliant on the quality of the IV derived from GWAS resulting in a false negative study. This lack of power also can be addressed with additional cohort analyses in GWAS.

Example 5

This example describes experiments to establish whether suPAR is a modifiable risk factor for CVD.

The CANTOS trial provided direct evidence that anti-inflammatory therapy can improve CV outcomes: patients with heart disease and elevated hs-CRP>2.0 mg/L randomized to canakinumab, a monoclonal antibody to interleukin 1β had a lower rate of cardiovascular events and reduction in hs-CRP compared to the placebo group (Ridker et al., N Engl J Med. 2017; 377(12):1119-31). The improvement in outcomes was commensurate to the reduction in hsCRP (Lancet. 2018; 391(10118):319-28). While both hs-CRP and suPAR are conceptualized as markers of inflammation, suPAR is a stronger predictor of outcomes, and is associated with subclinical markers of CVD, warranting an investigation into its role as a potentially modifiable risk factor. SuPAR levels can be altered with lifestyle modifications (Eugen-Olsen et al., Eur J Clin Invest. 2016; 46(4):305-11; Haupt et al., Immun Ageing. 2019; 16:1). The most notable change in suPAR levels is reflected in smoking, with a decrease of 30% after 4 weeks of smoking cessation in a randomized trial (Eugen-Olsen et al., supra; Haupt et al., supra). A general population based observational study in Denmark showed unhealthy dietary, exercise and smoking habits was associated with a 44% increase in suPAR levels at 5 years (Haupt et al., supra)). Whether suPAR levels are modified by medical therapy is less clear. In the Simvastatin and Ezetimibe in Aortic stenosis trial, patients who received statin and ezetimibe had a much lower increase in suPAR levels at 4 years compared to placebo (4.1% vs. 9.2%) (Hodges et al., Atherosclerosis. 2018; 272:129-36). While suggestive of a possible impact of statins on suPAR levels, findings could have been confounded by the use of concomitant ezetimibe, and the fact that suPAR levels were measured 4 years apart.

JUPITER is a randomized, double-blind trial of 17,603 participants (median age of 66, 39% women, 71% white) without prior cardiovascular disease or diabetes who were randomly allocated to rosuvastatin 20 mg or placebo and followed for up to 5 years for incident CVD (Ridker et al., N Engl J Med. 2008; 359: 2195-2207; Ridker, P. M. Circulation: Cardiovascular Quality and Outcomes. 2009; 2:279-285). Approval has been obtained to measure suPAR in 400 matched participants of JUPITER (n=200 in placebo, and n=200 in rosuvastatin arms), both at baseline and 1-year follow-up. Unfortunately, samples from patients with outcomes (cases) were depleted.

Figure 5A:
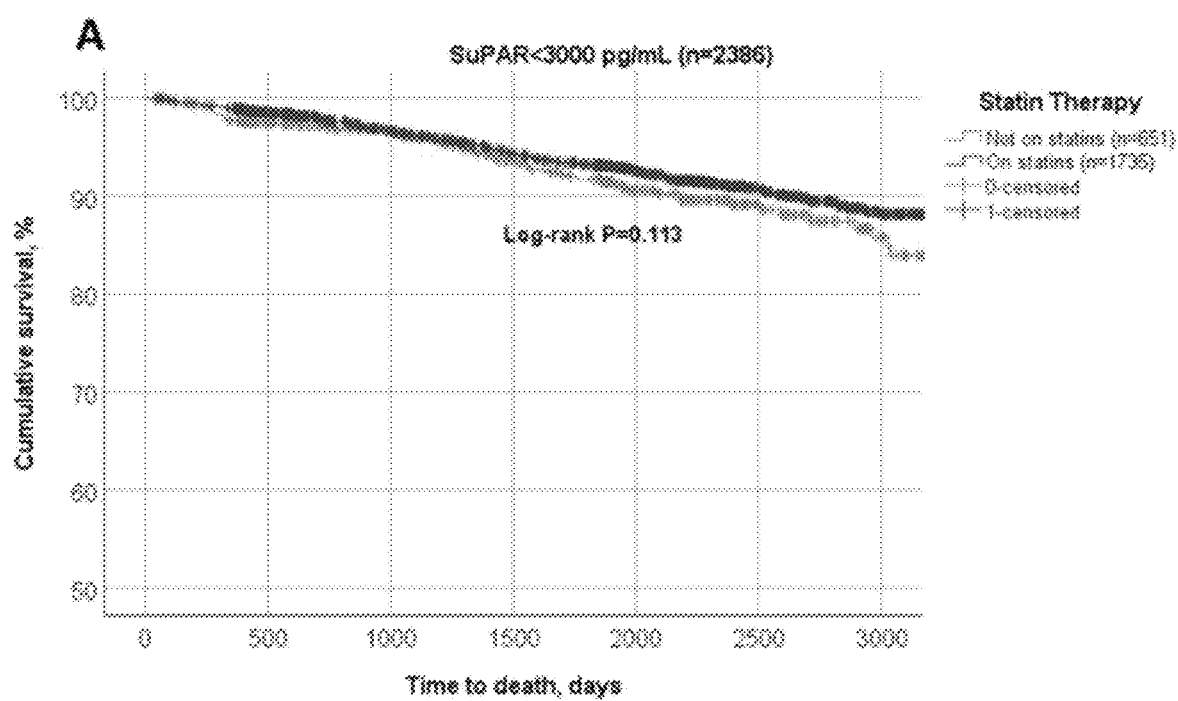
FIGS. 5A and 5B are graphs showing survival of patients stratified by statin therapy in patients with median suPAR levels<3000 pg/mL (5A) and patients with median suPAR levels>3000 pg/mL (5B).
Figure 5B:
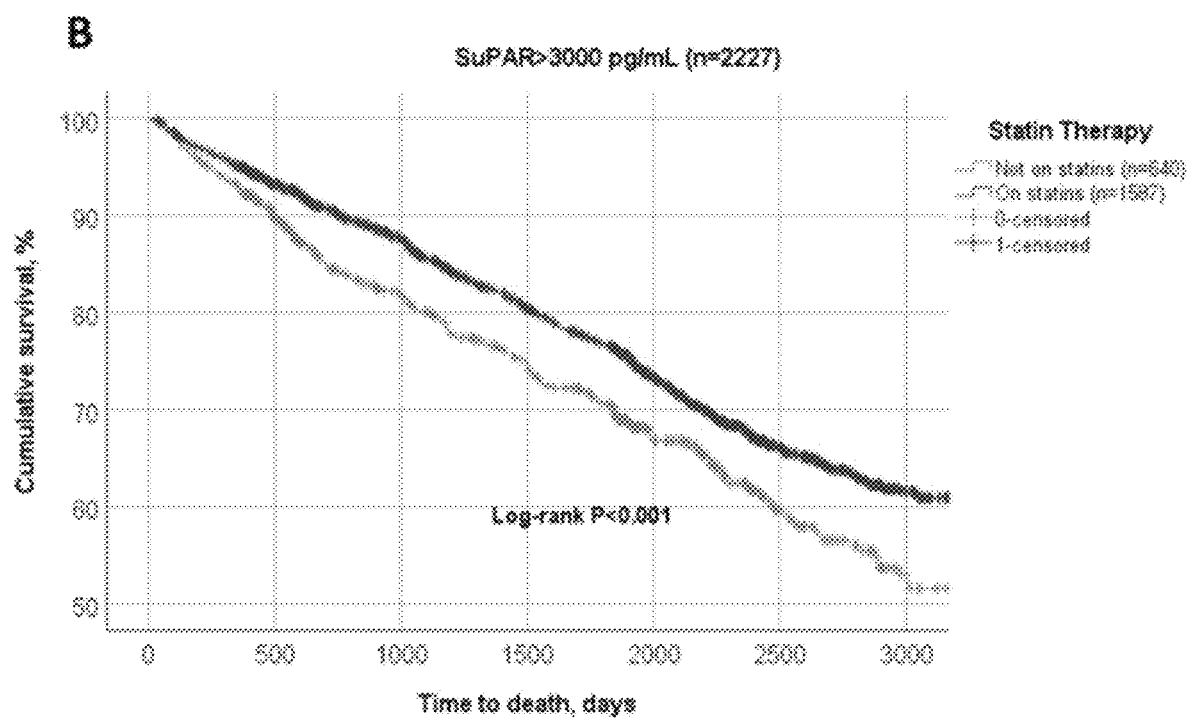

In preliminary data from the Emory Cardiovascular Biobank where suPAR was measured in 4,613 patients undergoing coronary angiography (mean age 64, 64% male, 19% African American, 53% with known CVD), statin therapy was associated with improved survival only in patients with suPAR≥3000 pg/mL (median suPAR level) (FIGS. 5A and 5B). The association was independent of traditional CV risk factors, including kidney function. These findings suggest that suPAR levels could be used to individualize therapy and to identify a subgroup that would maximally benefit from statins.

To determine whether suPAR levels modify the association between statins and outcomes, the interaction between suPAR and statins in their association with outcomes in MESA will examined. The primary outcome will be all-cause mortality (n=1248), and the secondary outcome will be incident CHD (n=889). A total of 1483 (26%) of MESA participants were on statin therapy, a proportion that remained relatively constant throughout the 5 years of the study; The mean survival time in participants on statin therapy was 15.5 years, compared to 14.8 years for participants not on statins. Kaplan-Meier survival curves will be generated stratifying the cohort by statin therapy and suPAR level (lower or higher than the median). Cox proportional hazards regression will then, be used to test the interaction between statins and suPAR (dichotomized or log-transformed continuous values) to assess whether the effect of statins on outcomes depends on the level of suPAR values. Additionally, this interaction will be tested after adjusting for potential confounders, such as age, gender, ethnicity, creatinine, smoking status, hypertension, LDL, HDL and diabetes mellitus. In power analyses based on the preliminary data (FIGS. 5A and 5B), the survival rate assumed at 5 years is 0.75 in the statins vs 0.68 in the non-statins groups in subjects with a high suPAR value, the study lasting for 10 years with subject accrual in the first 5 years, and a dropout rate of 10%. With 2892 subjects (half of subjects assuming median suPAR is used as a cut-off), assuming 20-26% are on statins, there will be 92-95% power to detect the hypothesized difference in the survival rates using a log-rank test at significant level of 0.05.

To determine whether statin therapy decreases suPAR levels, suPAR levels will be measured in 400 participants of the JUPITER trial (n=200 in each arm, placebo and rosuvastatin) at enrollment and 1-year follow-up. These participants will be selected from the overall cohort using propensity score matching after excluding those with abnormal creatinine values (creatinine>1.2 mg/dl). Specifically, subjects will be matched between the two arms based on age, gender, ethnicity, creatinine, smoking status, hypertension, LDL, HDL and hs-CRP levels. Matching will create balanced covariate distributions between the two arms. The absolute and percentage change in suPAR levels will be compared between placebo and rosuvastatin arms, using the paired t-test if it is 1:1 matching; otherwise, using linear mixed effect model to consider the "clustered" data induced by the matching. Furthermore, simple linear regression will be used to correlate the magnitude of change in suPAR to that of hs-CRP and LDL (log transformation will be used if necessary) and Spearman correlation coefficients will be computed if the relationship is expected to be monotonic rather than linear. In power analyses, it is estimated that 200 subjects per arm will provide 80% power to detect an effect size of 0.2 (mean difference in suPAR change between two arms divided by the standard deviation of the difference), using a paired t-test at a significant level 0.05.

Expected Results: Based on the preliminary data participants of MESA with high suPAR levels on statins will be expected have significantly better survival compared to those with similarly high levels but not on statins. Statins will have no impact on patients with low suPAR levels. A decrease in suPAR levels in the range of 10-20% with statin therapy compared to placebo also is expected.

The lack of samples from patients who met the endpoint in JUPITER may be a limitation. Thus, the MESA cohort will be used to translate findings from the Emory Cardiovascular Biobank and to determine whether suPAR modifies the association between statin and outcomes. If consistent with the preliminary data, these findings will be validated in the IMPROVE-IT trial, where a similar study has been done examining the roles of hs-CRP, hs-TnI, and BNP and a biomarker risk score in identifying patients who would benefit maximally from addition of ezetimibe. (107) suPAR also will be measured in MESA at a second time point (Exam 4), to assess whether the change in suPAR levels correlates with outcomes.

Example 6

This example demonstrates that a high level of suPAR predisposes patients to acute kidney injury in multiple clinical contexts.

Acute kidney injury is common, with a major effect on morbidity and health care utilization. Soluble urokinase plasminogen activator receptor (suPAR) is a signaling glycoprotein thought to be involved in the pathogenesis of kidney disease. It was investigated whether a high level of suPAR predisposed patients to acute kidney injury in multiple clinical contexts, and experimental models were used to identify mechanisms by which suPAR acts and to assess it as a therapeutic target.

Using the methods described in Hayek et al., *N. Engl. J. Med.*, 382: 416-26 (2020); doi: 10.1056/NEJMoa1911481, plasma levels of suPAR were measured preprocedurally in patients who underwent coronary angiography and patients who underwent cardiac surgery and at the time of admission to the intensive care unit in critically ill patients. The risk of acute kidney injury was assessed at 7 days as the primary outcome and acute kidney injury or death at 90 days as a secondary outcome, according to quartile of suPAR level. In experimental studies, a monoclonal antibody to urokinase plasminogen activator receptor (uPAR) was used as a therapeutic strategy to attenuate acute kidney injury in transgenic mice receiving contrast material. Cellular bioenergetics and generation of reactive oxygen species were also assessed in human kidney proximal tubular (HK-2) cells that were exposed to recombinant suPAR.

The suPAR level was assessed in 3827 patients who were undergoing coronary angiography, 250 who were undergoing cardiac surgery, and 692 who were critically ill. Acute kidney injury developed in 318 patients (8%) who had undergone coronary angiography. The highest suPAR quartile (vs. the lowest) had an adjusted odds ratio of 2.66 (95% confidence interval [CI], 1.77 to 3.99) for acute kidney injury and 2.29 (95% CI, 1.71 to 3.06) for acute kidney injury or death at 90 days. Findings were similar in the surgical and critically ill cohorts. The suPAR-overexpressing mice that were given contrast material had greater functional and histologic evidence of acute kidney injury than wild-type mice. The suPAR-treated HK-2 cells showed heightened energetic demand and mitochondrial superoxide generation. Pretreatment with a uPAR monoclonal antibody attenuated kidney injury in suPAR-overexpressing mice and normalized bioenergetic changes in HK-2 cells.

The results of this example demonstrate that high suPAR levels are associated with acute kidney injury in various clinical and experimental contexts.

Example 7

This example describes characterization of the link between suPAR and HFpEF.

Inflammation, a simple term for very complex processes, is thought to be the main driver of the pathophysiologic process leading to HFpEF. SuPAR levels, as a measure of overall burden of chronic inflammation, have been found to be predictive of incident HF in the general population, and cardiovascular mortality in patients with known HF independently of BNP (Koller et al., JACC Heart Fail. 2017; 5(4):268-77; Borne et al., Eur J Heart Fail. 2014; 16(4):377-83) Little is known of the underlying mechanisms, and whether suPAR levels correlate with measures of cardiac function and filling pressures.

suPAR levels were previously measured in 4613 patients undergoing coronary angiography for suspected CVD and enrolled in the Emory Cardiovascular Biobank, including 1157 with HF (mean age 64, 66% male, 26% black and 25% with EF<45%) (Ko et al., supra). suPAR was found to be significantly higher in patients with HF compared to non-HF; and higher in HFpEF compared to HF with reduced ejection fraction (HFrEF). The association between suPAR and HF was independent of age, gender, body mass index, and clinical characteristics including hypertension, diabetes mellitus, renal function, and BNP levels. SuPAR levels correlated modestly with HF symptoms as defined by NYHA class (r=0.15, P<0.001), and BNP levels (r=0.299, P<0.001). Interestingly, in multivariable analyses adjusting for both suPAR and BNP levels, only suPAR was significantly associated with HFpEF. Overall these findings suggest a link between suPAR and HF in general, and HFpEF in particular. These findings will be explored further detail in the TOPCAT trial.

TOPCAT was a multicenter, international, randomized, double-blind, placebo-controlled trial designed to determine whether treatment with spironolactone compared with placebo would reduce mortality and morbidity in patients with HFpEF (Pitt et al., supra). Eligible patients included those ≥50 years old with symptomatic HF and LVEF≥45%, controlled blood pressure, and either an HF hospitalization in the prior 12 months or elevated natriuretic peptide levels. At selected sites, patients were invited to contribute samples of serum, plasma, and urine to a biorepository. Patients that agreed to participate in this sub-study provided separate, written, informed consent to provide blood and urine samples at baseline and the 12-month study visit. Approval has been obtained to measure suPAR in all available baseline (n=404) and 12-month samples (n=328) of TOPCAT. The same primary study outcome will be used as the original TOPCAT; the composite of death from a cardiovascular cause, aborted cardiac arrest, or HF hospitalization (81 events). Mean duration of follow-up for the cohort was 2.6±1.5 years. <2% of data is missing in the available dataset.

suPAR was measured in blood samples of 404 patients with HFpEF enrolled in TOPCAT to confirm the above preliminary findings and investigate whether suPAR levels are associated with measures of elevated filling pressures and diastolic dysfunction grade. It was hypothesized that suPAR levels will correlate with indices of elevated filling pressures: diastolic dysfunction grade, E/e' ratio, and BNP levels, independently of kidney function.

suPAR levels in patients with HFpEF were compared to a matched non-HF cohort selected from the Emory Cardiovascular Biobank using 1:1 propensity score matching for age, gender, ethnicity, creatinine-derived estimated glomerular filtration rate (eGFR), smoking status, hypertension, diabetes mellitus, and BNP levels. Matching will create balanced covariate distributions between both groups. After log-transforming suPAR levels to a normal distribution an independent samples T-test will be used to compare suPAR values between both groups. For multivariable analyses logistic regression will be used with HFpEF as the dependent variable, and log-transformed suPAR in addition to the aforementioned variables and BNP forced in the model, to determine whether suPAR levels are independently associated with HFpEF. In power analyses based on the preliminary data, a sample size of 404 will achieve >95% power to detect a difference of 857 pg/mL when the significance level (alpha) of the test is 0.050 and the standard deviation is 2300.0 in both groups.

The correlation between suPAR levels and measures of diastolic dysfunction will be examined; notably, diastolic dysfunction grade will be assessed using the modified Olmsted criteria as the primary outcome, and individual measures of diastolic dysfunction will be as secondary outcomes, including average E/e' ratio, estimated pulmonary artery systolic pressures, and BNP levels (Nayor et al., J Am Heart Assoc. 2018; 7(11)). Spearman-Rank will be used to examine the univariable correlation between suPAR and diastolic dysfunction, and simple linear regression with log-transformed suPAR as the dependent variable and relevant clinical characteristics including eGFR and BNP as independent variables. In power analyses, a sample size of 404 achieves 83% power to detect a Spearman-Rank correlation of 0.15 (a conservative estimate) using a two-sided test with a significance level of 0.050.

Based on the preliminary findings, suPAR levels are expected to be significantly higher in patients with HFpEF, and to modestly correlate with measures of diastolic dysfunction and BNP levels in patients with HFpEF, suggesting suPAR levels are representative of the inflammatory process driving HFpEF.

The diagnosis of HFpEF is reliant on the incorporation of multiple dynamic variables such as diastolic dysfunction and BNP levels; both of which can be modified with therapy. Thus, the absence of a correlation between suPAR and these indices cannot rule out the existence of an association between HFpEF and suPAR. The hypothesis that suPAR levels reflect a pathogenic process leading to HF can be explored in a longitudinal approach. Approval has been obtained to measure suPAR in the Multi-Ethnic Study of Atherosclerosis (MESA), in which participants from the general population have been extensively characterized and underwent follow-up for events including incident HFpEF. MESA will be leveraged to determine whether participants with high suPAR levels are at high risk of incident HFpEF.

Despite extensive investigation, effective therapies in improving outcomes in patients with HFpEF have yet to be identified (Yusef et al., supra; Cleland et al., supra; Massie et al., supra; Pitt et al, supra; and Solomon et al., supra). The lack of benefit is attributed at least partially to the phenotypic diversity of HFpEF (Shah et al., supra). Posthoc analyses of HFpEF clinical trials have suggested biomarkers such as BNP can identify subgroups of patients with HFpEF that may benefit from certain therapies such as spironolactone or irbesartan (Pfeffer et al., supra; Anand et al., JACC Heart Fail. 2017; 5(4):241-52., and Anand et al., Circ Heart Fail. 2011; 4(5):569-77). BNP, however, is a dynamic biomarker whose increase results from myocardial stretch and high intracardiac filling pressures. Reduction in BNP levels are not associated with improved long term outcomes. It was examined whether suPAR, a marker of chronic inflammation with a link to HFpEF could be useful in identifying patients that would benefit from spironolactone.

Preliminary Results: suPAR's association with incident HF independently of BNP in a general population cohort suggests levels may reflect the underlying pathogenic process leading to HF (Borne et al., Eur J Heart Fail. 2014; 16(4):377-83). The predictive ability of suPAR has been compared to hs-CRP, hs-TnI and BNP in 4,613 patients undergoing coronary angiography for suspected CVD and enrolled in the Emory Cardiovascular Biobank (Nayor et al., J Am Heart Assoc. 2018; 7(11)), and found that suPAR is strongly predictive of outcomes including hospitalization for HF, and dramatically outperforms these markers in their ability to discriminate risk (Table 1). Most importantly, it found that the association between HFpEF and outcomes, specifically cardiovascular death and all-cause death, are dependent on suPAR levels: patients with HFpEF and suPAR levels<3000 pg/ml (median) had similar outcomes compared to patients without HF, while those with HFpEF and suPAR≥3000 pg/ml had significantly worse outcomes compared to non-HFpEF. This association was independent of gender or ethnicity. These preliminary findings support the use of suPAR in identifying high-risk HFpEF patients, but need to be replicated in a non-select group of HFpEF patients.

To confirm suPAR's association with outcomes in HFpEF, survival analyses were performed to determine whether suPAR levels are associated with the primary outcome in TOPCAT. In univariate analysis outcomes will be compared across suPAR tertiles using the log-rank test and produce Kaplan-Meier survival curves. Cox proportional hazards regression will then be used to study the effect of suPAR (groups or continuous value) on a step-wise fashion: the initial model will include suPAR alone, followed by forced entry of age, gender, ethnicity, eGFR, smoking status, hypertension, diabetes mellitus, and lastly, addition of diastolic dysfunction grade and BNP levels. The assumptions of proportional hazard and linear form of covariates (log-transformed or not) will be assessed by martingale residuals plots and the Kolmogorov-type supremum test.

To assess whether suPAR levels modify the association between treatment and outcomes, Kaplan-Meier survival curves will be generated stratifying the cohort by therapy (spironolactone and placebo) and suPAR level (lower or higher than the median). Cox proportional hazards regression will be used to test the interaction between therapy and suPAR (dichotomized by median or log-transformed continuous values) to assess whether the effect of spironolactone on outcomes depends on the level of suPAR values. Additionally, this interaction will be tested after adjusting for potential confounders, such as age, gender, and creatinine, smoking status, hypertension, LDL, HDL, and diabetes mellitus.

A power analyses based on preliminary data from the Emory Cardiovascular Biobank used the following conservative assumptions: a dichotomized suPAR using the median as a cutoff, and a cumulative hazard rate at 3 years of 0.0093 in the low suPAR group (<3000 pg/mL) and 0.0976 in high suPAR group, a study duration of 3 years, with subject accrual in the first 1 years, and an estimated drop-out rate of 10%. With 404 participants (191 in the placebo arm and 2013 in the spironolactone arm), there is >90% power to detect a difference in survival rate between high and low suPAR arms using a log-rank test at significant level of 0.05. Thus, there is adequate power to perform multivariable analyses, test interactions, and subgroup analyses.

Expected Results: based on this preliminary data, confirmation of a strong association between suPAR and outcomes in HFpEF is expected. An interaction between suPAR levels and treatment in their association with outcomes will represent a novel finding that has important implications for both clinical trial design and treatment of HFpEF patients, but will require prospective validation.

The preliminary data shows a significant effect size for the association between suPAR and outcomes in HFpEF, which should be confirmed in TOPCAT participants. However, the overall number of TOPCAT participants with stored biorepository samples is smaller than the overall cohort (12%), and was dependent on patients agreeing to participate, lending a risk of selection bias. While that bias cannot be eliminated, it should be minimized by measuring suPAR in all available samples. The biomarker cohort had only minor differences in baseline characteristics compared to the residual TOPCAT population: participants were less likely to be black, had lower systolic blood pressure, and lower prevalence of hypertension and atrial fibrillation. Studies have been published using this smaller cohort (Anand et al., JACC Heart Fail. 2017; 5(4):241-52; and Myhre et al., supra) Nevertheless, the findings will represent compelling preliminary data to incorporate suPAR levels in the design of prospective studies of therapies for HFpEF.

Example 8

This example describes experiments to establish whether suPAR is a modifiable risk factor for HFpEF.

Although HFpEF appears to be the end-result of a systemic pro-inflammatory state (see, e.g., Shah et al., supra, Paulus et al., J Am Coll Cardiol. 2013; 62(4):263-71, and Ter Maaten et al., Eur J Heart Fail. 2016; 18(6):588-98), clinical trials in HFpEF have mainly focused on the use of cardio-vascular-specific therapies such as beta-blockers and angiotensin-receptor antagonists, and most recently neprilysin inhibition with little success. There have been no attempts at targeting the inflammatory process in HFpEF, beyond addressing underlying co-morbidities. The data on spironolactone as a therapy is promising, and its benefits are thought to at least partially relate to its immunomodulatory activity. Thus, the ability of spironolactone to reduce inflammation was assessed by measuring suPAR levels, and it was examined whether the reduction translates to better outcomes.

Preliminary Results: Generally, suPAR levels show minimal variation, an attribute that likely contributes to its strength as a biomarker of risk. Compared to other inflammatory markers such as hs-CRP or IL-6, suPAR is not an acute phase reactant and remains stable even in highly stressful conditions as myocardial infarction or cardiac surgery. However, suPAR levels can be altered with lifestyle modifications (Haupt et al., supra; and Eugen-Olsen et al., supra) with the most notable changes reflected in smoking cessation, with a decrease of 30% after 4 weeks post-cessation. Unhealthy dietary, exercise, and smoking habits were associated with a 44% increase in suPAR levels at 5 years in a general population study. Whether suPAR levels can be modified by medical therapy is less clear. In the Simvastatin and Ezetimibe in Aortic stenosis trial, patients who received statin and ezetimibe had a lower increase in suPAR levels at 4 years compared to placebo (4.1% vs. 9.2%) (Hodges et al., supra). Whether a change in suPAR levels is associated with outcomes has not been reported.

suPAR levels were measured at 1-year post-enrollment to (a) address whether suPAR levels are modifiable using spironolactone, and (b) determine whether the change in suPAR is associated with the primary outcome of TOPCAT. It was hypothesized that suPAR levels at 1 year will be reduced in the spironolactone arm compared to placebo, and that a decrease in suPAR levels will be associated with better outcomes compared to unchanged or rising levels.

To assess whether spironolactone decreases suPAR levels, the absolute and percentage change in suPAR levels were compared from enrollment to 1-year between placebo and spironolactone arms using a paired t-test in univariable analysis, and a linear mixed effect model will be used to adjust for differences in clinical characteristics between arms. In power analyses, 200 subjects per arm are estimated to provide 80% power to detect an effect size of 0.2 (mean difference in suPAR change between two arms divided by the standard deviation of the difference), using a paired t-test at a significant level 0.05.

To determine whether the change in suPAR levels at 1-year are associated with outcomes, the absolute and percentage change in suPAR levels will be computed in survival analyses Kaplan-Meier survival curves will be produced comparing survival between patients with increasing vs. decreasing or unchanged suPAR levels using the Log-rank test. Cox proportional hazards regression will be used to adjust for relevant clinical characteristics including age, gender, hypertension, diabetes mellitus, kidney function, and randomization strategy, in addition to examining the interaction between randomization strategy and change in suPAR levels.

Expected Results: suPAR levels are expected to be significantly decreased at 1-year in the spironolactone arm compared to the placebo arm, and patients with decreasing suPAR levels are expected to have longer event-free survival compared to those with increasing suPAR levels.

The change in suPAR levels with spironolactone has not been previously explored, and the magnitude of change in suPAR varies depending on the intervention. In a population based non-interventional study, suPAR at 5-years was overall 6% higher, which is a small change. However, in a randomized trial of smoking cessation, a 30% decrease in suPAR levels was noted within 4 weeks. The overall small sample size may limit the ability to detect an association between small changes in suPAR and outcomes or perform subgroup analyses. suPAR will be measured at multiple time points in the MESA study to provide insight on whether the changes in levels are associated with outcomes.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of reducing the risk of a subject that does not suffer from stable cardiovascular disease from developing cardiovascular disease, the method comprising
   (a) measuring the level of soluble urokinase plasminogen activator receptor (suPAR) protein in a sample obtained from the subject; and
   (b) administering a statin to the subject if the level of suPAR in the sample is greater than a threshold level and not administering the statin to the subject if the level of suPAR in the sample is lower than the threshold level.

2. The method of claim 1, wherein the threshold level is 2.5 ng/ml.

3. The method of claim 1, wherein the threshold level is 3.0 ng/ml.

4. The method of claim 1, wherein the subject is at high risk for cardiovascular disease.

* * * * *